US012263428B2

(12) United States Patent
Malgorn

(10) Patent No.: US 12,263,428 B2
(45) Date of Patent: Apr. 1, 2025

(54) RADIAL SEAL FOR SPIN-ON FILTER

(71) Applicant: CUMMINS FILTRATION SARL, Quimper (FR)

(72) Inventor: Gérard Malgorn, Ergue Gaberic (FR)

(73) Assignee: CUMMINS FILTRATION SARL, Quimper (FR)

(\*) Notice: Subject to any disclaimer, the term of this patent is extended or adjusted under 35 U.S.C. 154(b) by 1016 days.

(21) Appl. No.: 17/260,628

(22) PCT Filed: Jul. 19, 2019

(86) PCT No.: PCT/IB2019/056208
§ 371 (c)(1),
(2) Date: Jan. 15, 2021

(87) PCT Pub. No.: WO2020/021418
PCT Pub. Date: Jan. 30, 2020

(65) Prior Publication Data
US 2021/0275954 A1 Sep. 9, 2021

Related U.S. Application Data

(60) Provisional application No. 62/702,027, filed on Jul. 23, 2018.

(51) Int. Cl.
*B01D 46/00* (2022.01)
*B01D 17/00* (2006.01)
(Continued)

(52) U.S. Cl.
CPC ......... *B01D 46/0005* (2013.01); *B01D 17/02* (2013.01); *B01D 17/10* (2013.01);
(Continued)

(58) Field of Classification Search
CPC .... B01D 46/0005; B01D 17/02; B01D 17/10; B01D 46/0004; B01D 46/2411;
(Continued)

(56) References Cited

U.S. PATENT DOCUMENTS 2,025,009 A 12/1935 Baker
2,093,877 A 9/1937 Von Pentz
(Continued)

FOREIGN PATENT DOCUMENTS

CM 109414639 9/2022
CN 1130539 9/1996
(Continued)

OTHER PUBLICATIONS

First Office Action issued for Chinese Patent Application No. CN 201980048336.6 issued Oct. 29, 2021, 9 pages.
(Continued)

*Primary Examiner* — Magali P Slawski
*Assistant Examiner* — Bernadette Karen McGann
(74) *Attorney, Agent, or Firm* — Foley & Lardner LLP

(57) ABSTRACT

A filtration system including a housing defining an internal volume. The housing includes a housing first end, a housing second end, and a first coupling member formed in the housing. The housing first end is an open end. The housing second end is a closed end. A filter element is positioned within the internal volume of the housing. The filter element is configured to engage the first coupling member. A filter head is provided. A seal member is disposed between the housing first end and the housing second end. The seal member provides a radial seal directly between the housing and the filter head.

13 Claims, 14 Drawing Sheets

(51) Int. Cl.
*B01D 17/02* (2006.01)
*B01D 46/24* (2006.01)
*B01D 46/52* (2006.01)
*F02M 37/22* (2019.01)

(52) U.S. Cl.
CPC ...... *B01D 46/0004* (2013.01); *B01D 46/2411* (2013.01); *B01D 46/525* (2013.01); *B01D 2265/021* (2013.01); *B01D 2265/028* (2013.01); *B01D 2265/029* (2013.01); *B01D 2271/027* (2013.01); *F02M 37/22* (2013.01)

(58) Field of Classification Search
CPC ............ B01D 46/525; B01D 2265/021; B01D 2265/028; B01D 2265/029; B01D 2271/027; B01D 27/08; B01D 2201/347; B01D 29/15; B01D 35/30; B01D 2201/301; B01D 2201/307; B01D 29/23; F02M 37/22
See application file for complete search history.

(56) References Cited

U.S. PATENT DOCUMENTS

| | | |
|---|---|---|
| 2,270,969 A | 1/1942 | Robinson |
| 2,306,325 A | 12/1942 | Sidney |
| 2,559,267 A | 7/1951 | Winslow et al. |
| 2,910,332 A | 10/1959 | Madsen |
| 2,915,188 A | 12/1959 | Buker |
| 2,955,028 A | 10/1960 | Bevans |
| 3,025,963 A | 3/1962 | Bauer |
| 3,224,592 A | 12/1965 | Burns et al. |
| 3,383,841 A | 5/1968 | Olson |
| 3,384,241 A | 5/1968 | Nostrand et al. |
| 3,494,113 A | 2/1970 | Kinney |
| 3,576,095 A | 4/1971 | Rivers |
| 3,582,095 A | 6/1971 | Bogaert |
| 3,598,738 A | 8/1971 | Pont |
| 3,645,402 A | 2/1972 | Alexander et al. |
| 3,687,849 A | 8/1972 | Abbott |
| 3,749,247 A | 7/1973 | Rohde |
| 4,014,794 A | 3/1977 | Lewis |
| 4,061,572 A | 12/1977 | Cohen et al. |
| 4,066,559 A | 1/1978 | Rohde |
| 4,075,097 A | 2/1978 | Paul |
| 4,075,098 A | 2/1978 | Paul et al. |
| 4,080,185 A | 3/1978 | Richter et al. |
| 4,128,251 A | 12/1978 | Gaither et al. |
| 4,129,429 A | 12/1978 | Humbert et al. |
| 4,144,169 A | 3/1979 | Grueschow |
| 4,181,313 A | 1/1980 | Hillier et al. |
| 4,211,543 A | 7/1980 | Tokar et al. |
| 4,257,890 A | 3/1981 | Hurner |
| 4,300,928 A | 11/1981 | Sugie |
| 4,324,213 A | 4/1982 | Kasting et al. |
| 4,364,751 A | 12/1982 | Copley |
| 4,402,912 A | 9/1983 | Krueger et al. |
| 4,410,427 A | 10/1983 | Wydeven |
| 4,473,471 A | 9/1984 | Corp |
| 4,572,522 A | 2/1986 | Smagatz |
| 4,589,983 A | 5/1986 | Wydevan |
| 4,600,420 A | 7/1986 | Wydeven et al. |
| 4,617,122 A | 10/1986 | Kruse et al. |
| 4,738,776 A | 4/1988 | Brown |
| 4,755,289 A | 7/1988 | Villani |
| 4,782,891 A | 11/1988 | Cheadle et al. |
| 4,826,517 A | 5/1989 | Norman |
| 4,861,359 A | 8/1989 | Tettman |
| 4,865,636 A | 9/1989 | Raber |
| 4,915,831 A | 4/1990 | Taylor |
| 4,925,561 A | 5/1990 | Ishii et al. |
| 4,951,834 A | 8/1990 | Aikins |
| 4,979,969 A | 12/1990 | Herding |
| 5,024,268 A | 6/1991 | Cheadle et al. |
| 5,050,549 A | 9/1991 | Sturmon |
| 5,069,799 A | 12/1991 | Brownawell et al. |
| 5,071,456 A | 12/1991 | Binder et al. |
| 5,094,745 A | 3/1992 | Reynolds |
| 5,114,572 A | 5/1992 | Hunter et al. |
| 5,120,334 A | 6/1992 | Cooper |
| 5,171,430 A | 12/1992 | Beach et al. |
| 5,203,994 A | 4/1993 | Janik |
| 5,213,596 A | 5/1993 | Kume et al. |
| 5,222,488 A | 6/1993 | Forsgren |
| 5,223,011 A | 6/1993 | Hanni |
| 5,225,081 A | 7/1993 | Brownawell |
| 5,228,891 A | 7/1993 | Adiletta |
| 5,258,118 A | 11/1993 | Gouritin et al. |
| 5,298,160 A | 3/1994 | Ayers et al. |
| 5,302,284 A | 4/1994 | Zeiner et al. |
| 5,342,511 A | 8/1994 | Brown et al. |
| 5,382,355 A | 1/1995 | Arlozynski |
| 5,391,212 A | 2/1995 | Ernst et al. |
| 5,435,346 A | 7/1995 | Tregidgo et al. |
| 5,459,074 A | 10/1995 | Muoni |
| 5,472,379 A | 12/1995 | Andress et al. |
| 5,472,463 A | 12/1995 | Herman et al. |
| 5,484,466 A | 1/1996 | Brown et al. |
| 5,494,497 A | 2/1996 | Lee |
| 5,498,332 A | 3/1996 | Handtmann |
| 5,512,074 A | 4/1996 | Hanni et al. |
| 5,531,848 A | 7/1996 | Brinda et al. |
| 5,556,542 A | 9/1996 | Berman et al. |
| 5,560,330 A | 10/1996 | Andress et al. |
| 5,562,825 A | 10/1996 | Yamada et al. |
| 5,569,311 A | 10/1996 | Oda et al. |
| 5,575,826 A | 11/1996 | Gillingham et al. |
| 5,591,330 A | 1/1997 | Lefebvre |
| 5,605,554 A | 2/1997 | Kennedy |
| 5,662,799 A | 9/1997 | Hudgens et al. |
| 5,672,399 A | 9/1997 | Kahlbaugh et al. |
| 5,702,602 A | 12/1997 | Brown et al. |
| 5,709,722 A | 1/1998 | Nagai et al. |
| 5,720,790 A | 2/1998 | Kometani et al. |
| 5,738,785 A | 4/1998 | Brown et al. |
| 5,753,116 A | 5/1998 | Baumann et al. |
| 5,753,117 A | 5/1998 | Jiang |
| 5,753,120 A | 5/1998 | Clausen et al. |
| 5,759,217 A | 6/1998 | Joy |
| 5,770,065 A | 6/1998 | Popoff et al. |
| 5,772,883 A | 6/1998 | Rothman et al. |
| 5,793,566 A | 8/1998 | Scura et al. |
| 5,795,361 A | 8/1998 | Lanier et al. |
| 5,803,024 A | 9/1998 | Brown |
| 5,820,646 A | 10/1998 | Gillingham et al. |
| 5,830,371 A | 11/1998 | Smith et al. |
| 5,853,439 A | 12/1998 | Gieseke et al. |
| 5,855,772 A | 1/1999 | Miller et al. |
| 5,863,424 A | 1/1999 | Lee |
| 5,891,402 A | 4/1999 | Sassa et al. |
| 5,893,939 A | 4/1999 | Rakocy et al. |
| 5,902,364 A | 5/1999 | Tokar et al. |
| 5,948,248 A | 9/1999 | Brown |
| 5,985,143 A | 11/1999 | Lin |
| 6,045,692 A | 4/2000 | Bilski et al. |
| D425,189 S | 5/2000 | Gillingham et al. |
| 6,086,763 A | 7/2000 | Baumann |
| 6,096,208 A | 8/2000 | Connelly et al. |
| 6,098,575 A | 8/2000 | Mulshine et al. |
| 6,099,612 A | 8/2000 | Bartos |
| 6,113,781 A | 9/2000 | Popoff et al. |
| 6,117,202 A | 9/2000 | Wetzel |
| 6,123,746 A | 9/2000 | Alvin et al. |
| 6,129,852 A | 10/2000 | Elliott et al. |
| 6,149,700 A | 11/2000 | Morgan et al. |
| 6,171,355 B1 | 1/2001 | Gieseke et al. |
| 6,171,491 B1 | 1/2001 | Popoff et al. |
| 6,179,890 B1 | 1/2001 | Ramos et al. |
| D437,402 S | 2/2001 | Gieseke et al. |
| 6,190,432 B1 | 2/2001 | Gieseke et al. |
| 6,196,019 B1 | 3/2001 | Higo et al. |
| 6,217,627 B1 | 4/2001 | Vyskocil et al. |
| 6,231,630 B1 | 5/2001 | Ernst et al. |
| 6,235,194 B1 | 5/2001 | Jousset |

(56) References Cited

U.S. PATENT DOCUMENTS

| | | | |
|---|---|---|---|
| 6,235,195 B1 | 5/2001 | Tokar | |
| 6,238,554 B1 | 5/2001 | Martin et al. | |
| 6,238,561 B1 | 5/2001 | Liu et al. | |
| 6,261,334 B1 | 7/2001 | Morgan et al. | |
| 6,264,831 B1 | 7/2001 | Hawkins et al. | |
| 6,264,833 B1 | 7/2001 | Reamsnyder et al. | |
| RE37,369 E | 9/2001 | Hudgens et al. | |
| 6,293,984 B1 | 9/2001 | Oda et al. | |
| 6,306,193 B1 | 10/2001 | Morgan et al. | |
| D450,828 S | 11/2001 | Tokar | |
| 6,322,697 B1 * | 11/2001 | Hacker | B01D 29/96 210/450 |
| 6,348,085 B1 | 2/2002 | Tokar et al. | |
| D455,826 S | 4/2002 | Gillingham et al. | |
| 6,375,700 B1 | 4/2002 | Jaroszczyk et al. | |
| 6,379,564 B1 | 4/2002 | Rohrbach et al. | |
| 6,391,076 B1 | 5/2002 | Jaroszczyk et al. | |
| 6,398,832 B2 | 6/2002 | Morgan et al. | |
| 6,402,798 B1 | 6/2002 | Kallsen et al. | |
| 6,416,561 B1 | 7/2002 | Kallsen et al. | |
| 6,447,566 B1 | 9/2002 | Rivera et al. | |
| 6,475,379 B2 | 11/2002 | Jousset et al. | |
| 6,478,018 B2 | 11/2002 | Fedorowicz et al. | |
| 6,478,019 B2 | 11/2002 | Fedorowicz et al. | |
| 6,478,958 B1 | 11/2002 | Beard et al. | |
| 6,482,247 B2 | 11/2002 | Jaroszczyk et al. | |
| 6,511,599 B2 | 1/2003 | Jaroszczyk et al. | |
| 6,517,598 B2 | 2/2003 | Anderson et al. | |
| 6,537,453 B2 | 3/2003 | Beard et al. | |
| D473,637 S | 4/2003 | Golden | |
| 6,547,857 B2 | 4/2003 | Gieseke et al. | |
| 6,554,139 B1 | 4/2003 | Maxwell et al. | |
| 6,571,962 B2 | 6/2003 | Thomas | |
| 6,596,165 B2 | 7/2003 | Koivula | |
| 6,610,126 B2 | 8/2003 | Xu et al. | |
| 6,623,636 B2 | 9/2003 | Rohrbach et al. | |
| 6,641,637 B2 | 11/2003 | Kallsen et al. | |
| 6,673,136 B2 | 1/2004 | Gillingham et al. | |
| 6,676,721 B1 | 1/2004 | Gillingham et al. | |
| 6,709,588 B2 | 3/2004 | Pavlin et al. | |
| 6,740,234 B1 | 5/2004 | Williams et al. | |
| 6,743,317 B2 | 6/2004 | Wydeven | |
| 6,746,518 B2 | 6/2004 | Gieseke et al. | |
| 6,787,033 B2 | 9/2004 | Beard et al. | |
| 6,823,996 B2 | 11/2004 | Durre | |
| 6,827,750 B2 | 12/2004 | Drozd et al. | |
| 6,835,304 B2 | 12/2004 | Jousset et al. | |
| 6,837,920 B2 | 1/2005 | Gieseke et al. | |
| 6,843,916 B2 | 1/2005 | Burrington et al. | |
| 6,860,241 B2 | 3/2005 | Martin et al. | |
| 6,893,571 B2 | 5/2005 | Harenbrock et al. | |
| 6,902,598 B2 | 6/2005 | Gunderson et al. | |
| 6,919,023 B2 | 7/2005 | Merritt et al. | |
| 6,922,894 B2 | 8/2005 | Durre | |
| 6,939,464 B1 | 9/2005 | Jiang et al. | |
| 6,953,124 B2 | 10/2005 | Winter et al. | |
| 6,966,940 B2 | 11/2005 | Krisko et al. | |
| 6,969,461 B2 | 11/2005 | Beard et al. | |
| 6,984,319 B2 | 1/2006 | Merritt et al. | |
| 6,996,940 B2 | 2/2006 | Beasley | |
| 6,998,045 B2 | 2/2006 | Durre | |
| 7,001,450 B2 | 2/2006 | Gieseke et al. | |
| 7,008,467 B2 | 3/2006 | Krisko et al. | |
| 7,018,531 B2 | 3/2006 | Eilers et al. | |
| 7,048,501 B2 | 5/2006 | Katayama et al. | |
| 7,070,641 B1 | 7/2006 | Gunderson et al. | |
| 7,081,145 B2 | 7/2006 | Gieseke et al. | |
| 7,090,711 B2 | 8/2006 | Gillingham et al. | |
| 7,153,422 B2 | 12/2006 | Herman et al. | |
| 7,156,991 B2 | 1/2007 | Herman et al. | |
| 7,160,451 B2 | 1/2007 | Hacker et al. | |
| 7,182,863 B2 | 2/2007 | Eilers et al. | |
| 7,182,864 B2 | 2/2007 | Brown et al. | |
| 7,211,124 B2 | 5/2007 | Gieseke | |
| 7,217,361 B2 | 5/2007 | Connor et al. | |
| 7,237,682 B2 | 7/2007 | Reynolds et al. | |
| 7,247,183 B2 | 7/2007 | Connor et al. | |
| 7,258,719 B2 | 8/2007 | Miller et al. | |
| 7,282,075 B2 | 10/2007 | Sporre et al. | |
| 7,311,747 B2 | 12/2007 | Adamek et al. | |
| 7,338,544 B2 | 3/2008 | Sporre et al. | |
| 7,344,582 B2 | 3/2008 | Pearson et al. | |
| 7,351,270 B2 | 4/2008 | Engelland et al. | |
| 7,396,375 B2 | 7/2008 | Nepsund et al. | |
| 7,425,226 B2 | 9/2008 | Powell | |
| 7,435,341 B2 | 10/2008 | Crawford et al. | |
| 7,491,254 B2 | 2/2009 | Krisko et al. | |
| 7,494,017 B2 | 2/2009 | Miller | |
| 7,524,416 B1 | 4/2009 | Bergmen | |
| 7,540,895 B2 | 6/2009 | Furseth et al. | |
| D600,790 S | 9/2009 | Nelson et al. | |
| 7,582,130 B2 | 9/2009 | Ng et al. | |
| 7,614,504 B2 | 11/2009 | South et al. | |
| 7,625,419 B2 | 12/2009 | Nelson et al. | |
| 7,645,310 B2 | 1/2010 | Krisko et al. | |
| 7,655,074 B2 | 2/2010 | Nepsund et al. | |
| 7,662,216 B1 | 2/2010 | Terres et al. | |
| 7,674,308 B2 | 3/2010 | Krisko et al. | |
| 7,682,416 B2 | 3/2010 | Engelland et al. | |
| 7,682,507 B2 | 3/2010 | Stamey et al. | |
| 7,731,753 B2 | 6/2010 | Reo et al. | |
| 7,776,139 B2 | 8/2010 | Schwandt et al. | |
| 7,799,108 B2 | 9/2010 | Connor et al. | |
| 7,828,869 B1 | 11/2010 | Parikh et al. | |
| 7,882,961 B2 | 2/2011 | Menez et al. | |
| 7,931,723 B2 | 4/2011 | Cuvelier | |
| 7,935,255 B2 | 5/2011 | Jiang | |
| 7,959,714 B2 | 6/2011 | Smith et al. | |
| 7,967,886 B2 | 6/2011 | Schrage et al. | |
| 7,972,405 B2 | 7/2011 | Engelland et al. | |
| 7,981,183 B2 | 7/2011 | Nepsund et al. | |
| 7,993,422 B2 | 8/2011 | Krisko et al. | |
| 8,016,903 B2 | 9/2011 | Nelson et al. | |
| 8,034,145 B2 | 10/2011 | Boehrs et al. | |
| 8,043,504 B2 | 10/2011 | Malgorn | |
| 8,048,187 B2 | 11/2011 | Merritt et al. | |
| 8,057,669 B2 | 11/2011 | Beard et al. | |
| 8,061,530 B2 | 11/2011 | Kindkeppel et al. | |
| 8,062,399 B2 | 11/2011 | Nelson et al. | |
| 8,096,423 B2 | 1/2012 | Menez et al. | |
| 8,097,061 B2 | 1/2012 | Smith et al. | |
| 8,101,003 B2 | 1/2012 | Krisko et al. | |
| 8,119,002 B2 | 2/2012 | Schiavon et al. | |
| 8,146,751 B2 | 4/2012 | Hawkins et al. | |
| 8,167,966 B2 | 5/2012 | Amirkhanian et al. | |
| 8,177,967 B2 | 5/2012 | Bagci et al. | |
| 8,211,199 B2 | 7/2012 | Holmes et al. | |
| 8,216,470 B2 | 7/2012 | Abdalla et al. | |
| 8,220,640 B2 | 7/2012 | Schmitz et al. | |
| 8,236,176 B2 | 8/2012 | Fall et al. | |
| 8,241,383 B2 | 8/2012 | Schrage et al. | |
| 8,276,763 B2 | 10/2012 | Shaam | |
| 8,277,532 B2 | 10/2012 | Reichter et al. | |
| 8,292,983 B2 | 10/2012 | Reichter et al. | |
| 8,328,897 B2 | 12/2012 | Nelson et al. | |
| 8,333,890 B2 | 12/2012 | Wells et al. | |
| 8,348,064 B2 | 1/2013 | Tandon | |
| 8,357,219 B2 | 1/2013 | Boehrs et al. | |
| 8,419,938 B2 | 4/2013 | Ries et al. | |
| 8,430,657 B2 | 4/2013 | Simonelli et al. | |
| 8,440,081 B2 | 5/2013 | Wieczorek | |
| 8,480,779 B2 | 7/2013 | Boehrs et al. | |
| 8,496,723 B2 | 7/2013 | Reichter et al. | |
| 8,501,001 B2 | 8/2013 | Curt et al. | |
| 8,506,666 B2 | 8/2013 | Haslebacher | |
| 8,517,183 B2 | 8/2013 | Thomas et al. | |
| 8,518,141 B2 | 8/2013 | Schrage et al. | |
| 8,544,158 B2 | 10/2013 | Curt et al. | |
| 8,550,656 B2 | 10/2013 | McCarthy et al. | |
| 8,562,707 B2 | 10/2013 | Nepsund et al. | |
| 8,636,820 B2 | 1/2014 | Reichter et al. | |
| 8,652,228 B2 | 2/2014 | Krisko et al. | |
| 8,709,119 B2 | 4/2014 | Reichter et al. | |
| 8,709,247 B2 | 4/2014 | Beard et al. | |

(56) References Cited

U.S. PATENT DOCUMENTS

| | | |
|---|---|---|
| 8,714,565 B1 | 5/2014 | Cornett et al. |
| 8,753,414 B2 | 6/2014 | Gebert |
| 8,778,043 B2 | 7/2014 | Krisko et al. |
| 8,840,699 B2 | 9/2014 | Bruce et al. |
| 8,845,897 B2 | 9/2014 | Wieczorek et al. |
| 8,852,308 B2 | 10/2014 | Jarrier |
| 8,906,128 B2 | 12/2014 | Reichter et al. |
| 8,911,498 B2 | 12/2014 | Bartish et al. |
| 8,926,725 B2 | 1/2015 | Loken et al. |
| 8,932,465 B2 | 1/2015 | Wells et al. |
| 9,011,683 B2 | 4/2015 | South et al. |
| 9,101,883 B2 | 8/2015 | Pugh et al. |
| 9,114,346 B2 | 8/2015 | Schrage et al. |
| 9,211,488 B2 | 12/2015 | South et al. |
| 9,308,476 B2 | 4/2016 | Martin et al. |
| 9,320,997 B2 | 4/2016 | Campbell et al. |
| 9,409,107 B2 | 8/2016 | Arakeri et al. |
| 9,415,333 B2 | 8/2016 | Kindkeppel et al. |
| 9,500,167 B2 | 11/2016 | Verdegan et al. |
| 9,724,627 B2 | 8/2017 | Malgorn et al. |
| 9,782,706 B1 | 10/2017 | Levy |
| 9,782,708 B2 | 10/2017 | Kindkeppel et al. |
| 9,943,790 B2 | 4/2018 | Page et al. |
| 10,010,816 B2 | 7/2018 | Moessinger et al. |
| 10,309,078 B2 | 6/2019 | Wells et al. |
| 10,493,385 B2 | 12/2019 | Glazewski et al. |
| 10,661,207 B2 | 5/2020 | Page et al. |
| 10,682,597 B2 | 6/2020 | Krull et al. |
| 10,729,999 B2 | 8/2020 | Nichols et al. |
| 10,731,315 B2 | 8/2020 | Wells et al. |
| 10,744,443 B2 | 8/2020 | Silvestro |
| 10,835,852 B2 | 11/2020 | Decoster et al. |
| 11,091,895 B2 | 8/2021 | Wells et al. |
| 11,141,687 B2 | 10/2021 | Knight et al. |
| 11,198,077 B2 | 12/2021 | Jiang et al. |
| 11,285,411 B2 | 3/2022 | Burgan et al. |
| 11,413,559 B2 | 8/2022 | Glazewski et al. |
| 11,446,595 B2 | 9/2022 | Malgorn et al. |
| 11,452,958 B2 | 9/2022 | Page et al. |
| 11,655,609 B2 | 5/2023 | Wells et al. |
| 11,724,220 B2 | 8/2023 | Ouweleen et al. |
| 2001/0032545 A1 | 10/2001 | Goto et al. |
| 2002/0046556 A1 | 4/2002 | Reid |
| 2002/0060178 A1 | 5/2002 | Tsabari |
| 2002/0073850 A1 | 6/2002 | Tokar et al. |
| 2002/0096247 A1 | 7/2002 | Wydeven |
| 2002/0157359 A1 | 10/2002 | Stenersen et al. |
| 2002/0158006 A1 | 10/2002 | Thomas |
| 2002/0170280 A1 | 11/2002 | Soh |
| 2002/0185007 A1 | 12/2002 | Xu et al. |
| 2002/0185454 A1 | 12/2002 | Beard et al. |
| 2002/0195384 A1 | 12/2002 | Rohrbach et al. |
| 2003/0121845 A1 | 7/2003 | Wagner et al. |
| 2003/0154863 A1 | 8/2003 | Tokar et al. |
| 2003/0184025 A1 | 10/2003 | Matsuki |
| 2003/0218150 A1 | 11/2003 | Blakemore et al. |
| 2003/0226790 A1 | 12/2003 | Brown et al. |
| 2004/0031745 A1 | 2/2004 | Moessinger et al. |
| 2004/0035097 A1 | 2/2004 | Schlensker et al. |
| 2004/0040271 A1 | 3/2004 | Kopec et al. |
| 2004/0060861 A1 | 4/2004 | Winter et al. |
| 2004/0091652 A1 | 5/2004 | Kikuchi et al. |
| 2004/0091654 A1 | 5/2004 | Kelly et al. |
| 2004/0140255 A1 | 7/2004 | Merritt et al. |
| 2004/0173097 A1 | 9/2004 | Engelland et al. |
| 2004/0187689 A1 | 9/2004 | Sporre et al. |
| 2004/0221555 A1 | 11/2004 | Engelland et al. |
| 2004/0226443 A1 | 11/2004 | Gillingham et al. |
| 2005/0019236 A1 | 1/2005 | Martin et al. |
| 2005/0024061 A1 | 2/2005 | Cox et al. |
| 2005/0166561 A1 | 8/2005 | Schrage et al. |
| 2005/0173325 A1 | 8/2005 | Klein et al. |
| 2005/0178706 A1 | 8/2005 | Bagei |
| 2005/0178714 A1 | 8/2005 | Stockbower |
| 2005/0178715 A1 | 8/2005 | Thomas et al. |
| 2005/0193695 A1 | 9/2005 | Holmes et al. |
| 2005/0194312 A1 | 9/2005 | Niemeyer et al. |
| 2005/0224061 A1 | 10/2005 | Ulrich et al. |
| 2005/0252848 A1 | 11/2005 | Miller |
| 2006/0064956 A1 | 3/2006 | Connor et al. |
| 2006/0113233 A1 | 6/2006 | Merritt et al. |
| 2006/0118474 A1 | 6/2006 | Kolczyk et al. |
| 2006/0180537 A1 | 8/2006 | Loftis et al. |
| 2006/0213139 A1 | 9/2006 | Stramandinoli |
| 2006/0219626 A1 | 10/2006 | Dworatzek et al. |
| 2007/0037428 A1 | 2/2007 | Annecke |
| 2007/0045167 A1 | 3/2007 | Jaroszczyk et al. |
| 2007/0095744 A1 | 5/2007 | Bagci et al. |
| 2007/0175815 A1 | 8/2007 | Thomas |
| 2007/0240392 A1 | 10/2007 | Ng et al. |
| 2007/0261374 A1 | 11/2007 | Nelson et al. |
| 2007/0267338 A1 | 11/2007 | Menez et al. |
| 2008/0011672 A1 | 1/2008 | Schwartz et al. |
| 2008/0022641 A1 | 1/2008 | Engelland et al. |
| 2008/0035587 A1 | 2/2008 | Wieczorek et al. |
| 2008/0047132 A1 | 2/2008 | Wieczorek |
| 2008/0087589 A1 | 4/2008 | Grzonka et al. |
| 2008/0107765 A1 | 5/2008 | Considine et al. |
| 2008/0110142 A1 | 5/2008 | Nelson et al. |
| 2008/0179263 A1 | 7/2008 | Wieczorek et al. |
| 2008/0237113 A1 | 10/2008 | Jensen |
| 2008/0250766 A1 | 10/2008 | Schrage et al. |
| 2008/0307759 A1 | 12/2008 | Reichter et al. |
| 2008/0308481 A1 | 12/2008 | Wieczorek et al. |
| 2009/0014381 A1 | 1/2009 | South et al. |
| 2009/0026124 A1 | 1/2009 | Schmitz et al. |
| 2009/0050554 A1 | 2/2009 | Shaam |
| 2009/0057213 A1 | 3/2009 | Schiavon et al. |
| 2009/0057219 A1 | 3/2009 | Bagci et al. |
| 2009/0064646 A1 | 3/2009 | Reichter et al. |
| 2009/0071892 A1 | 3/2009 | Malgorn |
| 2009/0090669 A1 | 4/2009 | Holzmann et al. |
| 2009/0095669 A1 | 4/2009 | South |
| 2009/0126324 A1 | 5/2009 | Smith et al. |
| 2009/0127198 A1 | 5/2009 | Salvador et al. |
| 2009/0135590 A1 | 5/2009 | Mccarthy et al. |
| 2009/0151311 A1 | 6/2009 | Reichter et al. |
| 2009/0193972 A1 | 8/2009 | Schwandt et al. |
| 2009/0241315 A1 | 10/2009 | Menez et al. |
| 2009/0242475 A2 | 10/2009 | Menez et al. |
| 2009/0249754 A1 | 10/2009 | Amirkhanian et al. |
| 2009/0326657 A1 | 12/2009 | Grinberg et al. |
| 2010/0001477 A1 | 1/2010 | Eyers et al. |
| 2010/0043366 A1 | 2/2010 | Boehrs et al. |
| 2010/0051528 A1 | 3/2010 | Derstler et al. |
| 2010/0064646 A1 | 3/2010 | Smith et al. |
| 2010/0065203 A1 | 3/2010 | Tanbour et al. |
| 2010/0077710 A1 | 4/2010 | Severance et al. |
| 2010/0101993 A1 | 4/2010 | Wells et al. |
| 2010/0108590 A1 | 5/2010 | Curt et al. |
| 2010/0114318 A1 | 5/2010 | Gittings et al. |
| 2010/0126919 A1 | 5/2010 | Hawkins et al. |
| 2010/0150764 A1 | 6/2010 | Simonelli et al. |
| 2010/0170209 A1 | 7/2010 | Nelson et al. |
| 2010/0176047 A1 | 7/2010 | Bagci et al. |
| 2010/0186353 A1 | 7/2010 | Ackermann et al. |
| 2010/0200490 A1 | 8/2010 | Martin et al. |
| 2010/0258493 A1 | 10/2010 | Kindkeppel et al. |
| 2010/0263339 A1 | 10/2010 | Steins et al. |
| 2010/0294707 A1 | 11/2010 | Abdalla et al. |
| 2010/0294712 A1 | 11/2010 | Abdalla et al. |
| 2011/0089104 A1 | 4/2011 | Menez et al. |
| 2011/0132829 A1 | 6/2011 | Tucker et al. |
| 2011/0139699 A1* | 6/2011 | Tucker .................. B01D 29/111 210/232 |
| 2011/0197556 A1 | 8/2011 | Brown et al. |
| 2011/0203099 A1 | 8/2011 | Curt et al. |
| 2011/0260413 A1 | 10/2011 | Voltenburg et al. |
| 2011/0303604 A1 | 12/2011 | McKenzie |
| 2012/0031059 A1 | 2/2012 | Haslebacher |
| 2012/0055127 A1 | 3/2012 | Holzmann et al. |
| 2012/0061307 A1 | 3/2012 | Kindkeppel et al. |
| 2012/0067013 A1 | 3/2012 | Antony et al. |
| 2012/0223008 A1 | 9/2012 | Mbadinga-Mouanda et al. |

(56) References Cited

U.S. PATENT DOCUMENTS

| | | |
|---|---|---|
| 2013/0015119 A1 | 1/2013 | Pugh et al. |
| 2013/0033006 A1 | 2/2013 | Salvador et al. |
| 2013/0087497 A1 | 4/2013 | Wells et al. |
| 2013/0220914 A1 | 8/2013 | Hawkins et al. |
| 2013/0291502 A1 | 11/2013 | Gorman |
| 2013/0327696 A1 | 12/2013 | Bagci et al. |
| 2014/0027366 A1 | 1/2014 | Hawkins et al. |
| 2014/0034565 A1 | 2/2014 | Loken et al. |
| 2014/0034566 A1 | 2/2014 | Verdegan et al. |
| 2014/0048468 A1 | 2/2014 | Kindkeppel et al. |
| 2014/0071669 A1 | 3/2014 | McCarthy et al. |
| 2014/0096493 A1 | 4/2014 | Kelmartin et al. |
| 2014/0151275 A1 | 6/2014 | Bradford et al. |
| 2014/0190880 A1 | 7/2014 | Krull |
| 2014/0251895 A1 | 9/2014 | Wagner |
| 2014/0260143 A1 | 9/2014 | Kaiser |
| 2014/0290194 A1 | 10/2014 | Muenkel et al. |
| 2014/0318090 A1 | 10/2014 | Rieger et al. |
| 2014/0366494 A1* | 12/2014 | Ardes ............... B01D 35/153 210/232 |
| 2015/0013289 A1 | 1/2015 | Hasenfratz et al. |
| 2015/0013293 A1 | 1/2015 | Wagner et al. |
| 2015/0033684 A1 | 2/2015 | Pettersson |
| 2015/0060351 A1 | 3/2015 | Kaufmann et al. |
| 2015/0061307 A1 | 3/2015 | Nakanishi |
| 2015/0090651 A1 | 4/2015 | Kotale et al. |
| 2015/0090656 A1 | 4/2015 | Mandt et al. |
| 2015/0096273 A1 | 4/2015 | Kaiser |
| 2015/0096932 A1 | 4/2015 | Hou et al. |
| 2015/0101295 A1 | 4/2015 | Thompson et al. |
| 2015/0107201 A1 | 4/2015 | Cornaglia |
| 2015/0176544 A1 | 6/2015 | Kaufmann et al. |
| 2015/0202556 A1 | 7/2015 | Hawkins et al. |
| 2015/0231532 A1 | 8/2015 | Pugh et al. |
| 2015/0285381 A1 | 10/2015 | Preston et al. |
| 2016/0023142 A1 | 1/2016 | Arakeri et al. |
| 2016/0045848 A1 | 2/2016 | Campbell et al. |
| 2016/0059172 A1 | 3/2016 | Allott et al. |
| 2016/0082372 A1 | 3/2016 | South et al. |
| 2016/0160816 A1 | 6/2016 | Venkatraman et al. |
| 2016/0169391 A1 | 6/2016 | Emig et al. |
| 2016/0220931 A1 | 8/2016 | Ardes |
| 2016/0222931 A1 | 8/2016 | Jiang et al. |
| 2016/0228798 A1 | 8/2016 | Page et al. |
| 2016/0258397 A1 | 9/2016 | Jiang et al. |
| 2016/0332098 A1 | 11/2016 | Chavan et al. |
| 2016/0332103 A1 | 11/2016 | Marks et al. |
| 2017/0014738 A1 | 1/2017 | Malgorn et al. |
| 2017/0078852 A1 | 3/2017 | Tan et al. |
| 2018/0318745 A1 | 11/2018 | Nichols et al. |
| 2020/0324237 A1 | 10/2020 | Moers et al. |
| 2021/0129049 A1 | 5/2021 | Yesane et al. |
| 2021/0275954 A1 | 9/2021 | Malgorn |
| 2022/0047971 A1 | 2/2022 | Abdalla et al. |
| 2022/0339560 A1 | 10/2022 | Glazewski et al. |
| 2022/0379245 A1 | 12/2022 | Oren et al. |
| 2023/0166208 A1 | 6/2023 | Decugniere |

FOREIGN PATENT DOCUMENTS

| | | |
|---|---|---|
| CN | 1139884 | 1/1997 |
| CN | 1193288 A | 9/1998 |
| CN | 2296402 Y | 11/1998 |
| CN | 1486213 A | 3/2004 |
| CN | 1590746 B | 3/2005 |
| CN | 2372041 Y | 4/2005 |
| CN | 1754612 A | 4/2006 |
| CN | 101084050 A | 12/2007 |
| CN | 101184544 | 5/2008 |
| CN | 101374582 A | 2/2009 |
| CN | 201292900 Y | 8/2009 |
| CN | 101695616 A | 4/2010 |
| CN | 201696412 | 1/2011 |
| CN | 102046259 A | 5/2011 |
| CN | 102083510 A | 6/2011 |
| CN | 102271780 A | 12/2011 |
| CN | 202746046 U | 2/2013 |
| CN | 103501873 A | 1/2014 |
| CN | 103977647 A | 8/2014 |
| CN | 104220142 A | 12/2014 |
| CN | 105658944 A | 6/2016 |
| CN | 105688498 A | 6/2016 |
| CN | 105899271 A | 8/2016 |
| CN | 106102858 A | 11/2016 |
| CN | 110382075 A | 10/2019 |
| CN | 110418675 | 11/2019 |
| CN | 202040173 | 11/2020 |
| CN | 112334209 | 2/2021 |
| CN | 112469487 | 3/2021 |
| CN | 109890479 | 11/2021 |
| DE | 88 08 632 U1 | 9/1988 |
| DE | 29613098 U1 | 9/1996 |
| DE | 20 2004 014 559 U1 | 1/2005 |
| DE | 10 2008 062 956 A1 | 6/2010 |
| DE | 10 2014 102 794 | 5/2018 |
| DE | 11 2018 000 343 | 9/2019 |
| DE | 20 2020 104 741 | 11/2020 |
| DE | 11 2019 003 046 | 3/2021 |
| DE | 11 2006 001 365 | 4/2021 |
| EP | 0 718 021 A1 | 6/1996 |
| EP | 0 747 579 A2 | 12/1996 |
| EP | 0 982 062 A2 | 3/2000 |
| EP | 1 129 760 A2 | 9/2001 |
| EP | 1 166 843 A1 | 1/2002 |
| EP | 1 208 902 A1 | 5/2002 |
| EP | 1 233 173 A2 | 8/2002 |
| EP | 1 693 096 A2 | 8/2006 |
| EP | 1 693 096 B1 | 8/2006 |
| EP | 1 747 053 A1 | 1/2007 |
| EP | 3 370 849 A1 | 9/2018 |
| EP | 3 528 920 A1 | 8/2019 |
| EP | 4 122 576 A1 | 1/2023 |
| FR | 2214505 A1 | 8/1974 |
| FR | 3018202 | 12/2017 |
| FR | 3057177 | 4/2022 |
| GB | 0 970 826 A | 9/1964 |
| GB | 2 082 932 A | 3/1982 |
| GB | 2 404 348 A | 2/2005 |
| JP | 60-112320 A | 6/1985 |
| JP | 01-163408 A | 6/1989 |
| JP | 01-171615 A | 7/1989 |
| JP | 02-025009 A | 1/1990 |
| MX | 2019010714 | 2/2019 |
| MX | 2019008240 | 9/2019 |
| MX | 2020013448 | 2/2021 |
| WO | WO-97/16235 | 5/1997 |
| WO | WO-00/50152 A1 | 8/2000 |
| WO | WO-00/74818 A1 | 12/2000 |
| WO | WO-01/05485 A1 | 1/2001 |
| WO | WO-2004/054684 A1 | 7/2004 |
| WO | WO-2005/058461 A1 | 6/2005 |
| WO | WO-2005/077487 A1 | 8/2005 |
| WO | WO-2006/093981 A2 | 9/2006 |
| WO | WO-2007/009039 A1 | 1/2007 |
| WO | WO-2007/089662 A2 | 8/2007 |
| WO | WO-2012/153430 A1 | 11/2012 |
| WO | WO-2014/111162 A1 | 7/2014 |
| WO | WO-2017/079191 A1 | 5/2017 |
| WO | WO-2017/120113 A1 | 7/2017 |
| WO | WO-2017/180875 A1 | 10/2017 |
| WO | WO-2018/075063 A1 | 4/2018 |
| WO | WO-2018/156489 A1 | 8/2018 |
| WO | WO-2018/175438 A1 | 9/2018 |
| WO | WO-2022/150130 | 7/2022 |

OTHER PUBLICATIONS

Extended European Search Report issued for European Patent Application No. EP 22196095.8 issued Dec. 13, 2022, 7 pages.
International Search Report and Written Opinion issued for PCT Application No. PCT/IB2019/056208, issued Nov. 21, 2019, 12 pages.

(56) References Cited

OTHER PUBLICATIONS

International Search Report and Written Opinion issued for PCT/US 2018/014401, issued May 15, 2018, 18 pages.
International Search Report and Written Opinion issued for PCT/US2018/018724, issued Apr. 24, 2018, 13 pages.
Office Action issued for U.S. Appl. No. 16/478,092, issued Aug. 18, 2020, 27 pages.
First Office Action issued for Chinese Patent Publication No. CN 201880012627.5, issued Dec. 28, 2020, 10 pages.
US Office Action on U.S. Appl. No. 16/478,092 DTD Feb. 9, 2021.
Akro-Mils, "Nest & Stack Totes," retrieved from http://web.archive.org/web/20150323114331/https://akro-mils.com/produts/types/plastic-storage-containers/nest-stack-totes, 1 page (2015).
First Examination Report for Indian Patent App. No. 202047056950 dated Mar. 24, 2021, 5 pages.
First Examination Report for Indian Patent App. No. 3035/KOLNP/2011, dated Feb. 8, 2019, 7 pages.
First Office Action for Chinese Patent App. No. 201080004417.5, dated May 24, 2013, 13 pages (with translation).
First Office Action for Chinese Patent App. No. 2016800710703 dated Nov. 26, 2019, 29 pages (with translation).
First Office Action issued for Chinese Patent App. No. 201880018033.5 issued Dec. 24, 2020, 10 pages (with English translation).
International Search Report & Written Opinion for PCT/US2010/024765 dated Apr. 7, 2010, 9 pages.
International Search Report and Written Opinion for PCT/US2016/063053, dated Feb. 16, 2017, 8 pages.
International Search Report and Written Opinion for PCT/US2017/021615, dated Jun. 6, 2017, 8 pages.
International Search Report and Written Opinion for PCT/US2017/030386, dated Jul. 26, 2017, 9 pages.
International Search Report and Written Opinion for PCT/US2018/018696, dated Apr. 19, 2018, 8 pages.
Office Action for German Patent App. No. 11 2010 001 567.8 dated May 18, 2017, 12 pages (with translation).
Second Office Action for Chinese Patent App. No. 201080004417.5, dated Mar. 5, 2014, 28 pages (with translation).
Final Office Action on U.S. Appl. No. 16/487,209 DTD Jun. 20, 2022.
International Search Report and Written Opinion issued for PCT Application No. PCT/US2021/017197 issued Jun. 25, 2021, 16 pages.
Non-Final Office Action on U.S. Appl. No. 16/487,209 DTD Oct. 18, 2022.
Third Office Action issued for Chinese Patent No. 201980048336.6 issued Nov. 3, 2022, 10 pages.
Non-Final Office Action for U.S. Appl. No. 16/478,092, dated Jul. 30, 2021.
Office Action issued for Chinese Patent Application No. CN 201880007980.4 issued Jul. 9, 2021, 7 pages.
First Office Action issued for Chinese Patent Application No. 202180013535.0 issued Feb. 7, 2024, 9 pages.
Non-Final Office Action on U.S. Appl. No. 17/474,306 issued Oct. 6, 2022.
Non-Final Office Action on U.S. Appl. No. 17/516,431 issued Feb. 7, 2023.
Notice of Allowance on U.S. Appl. No. 17/474,306 issued Feb. 1, 2023.
Notice of Allowance on U.S. Appl. No. 17/516,431 issued Jul. 12, 2023.
EP Examination Report dtd Sep. 20, 2024.
Non-Final Office Action on U.S. Appl. No. 18/196,550 dtd Sep. 12, 2024.

* cited by examiner

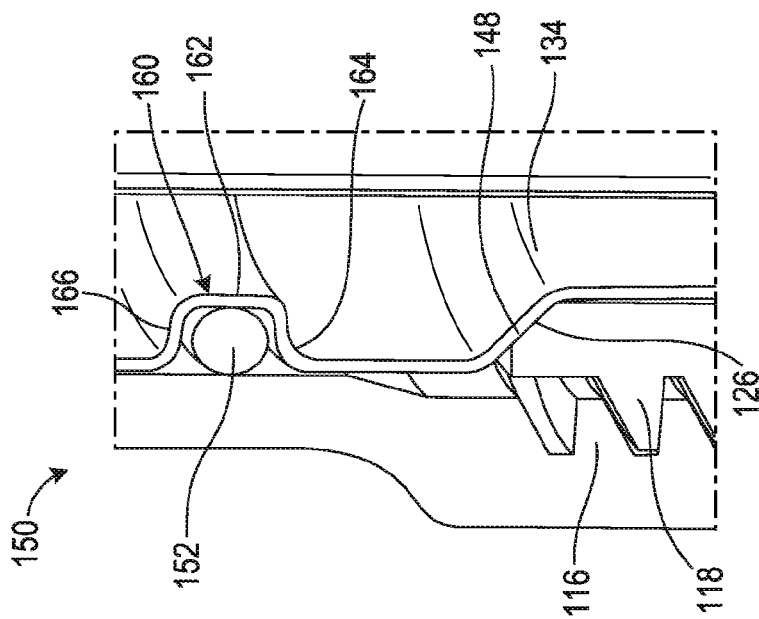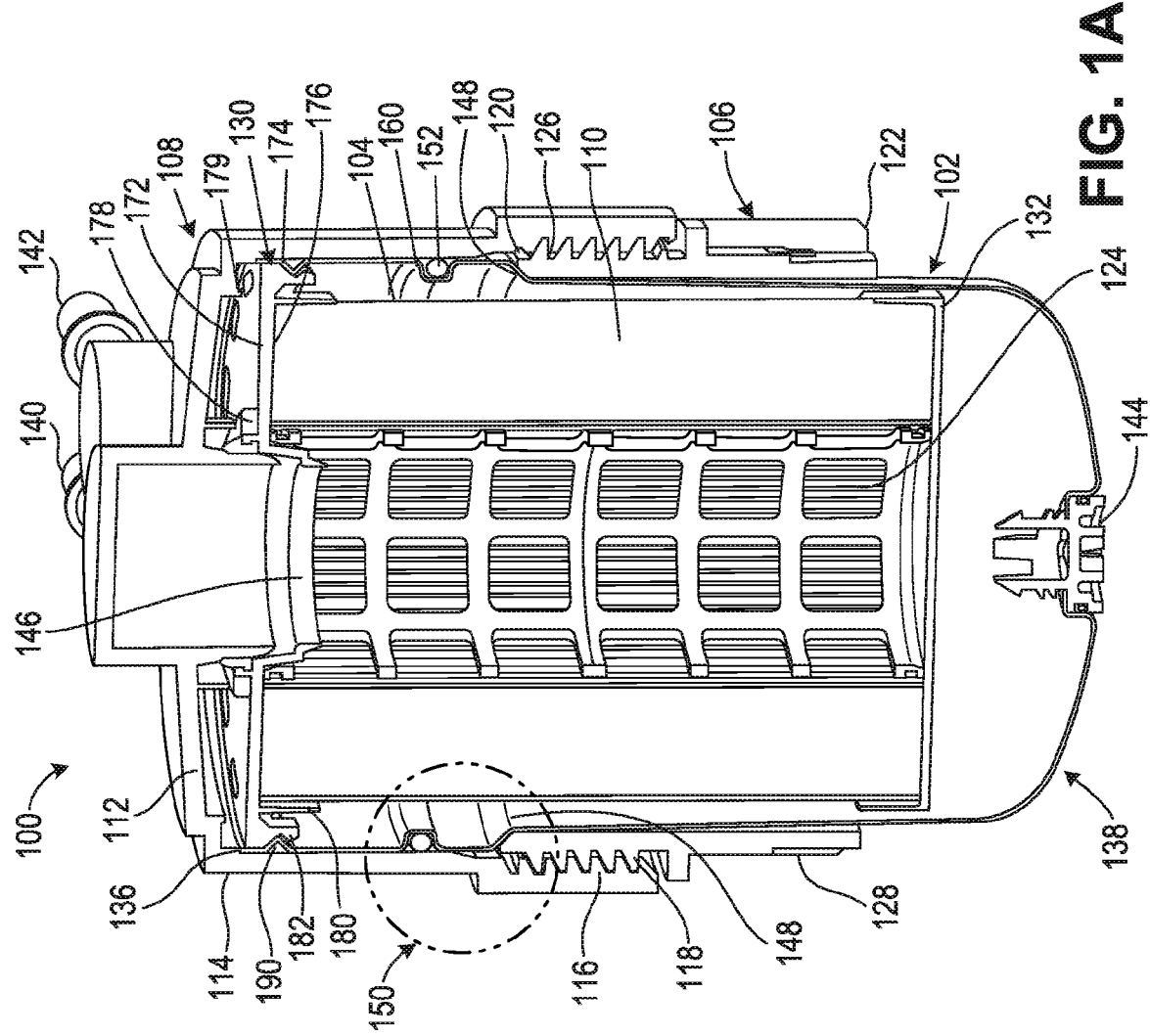

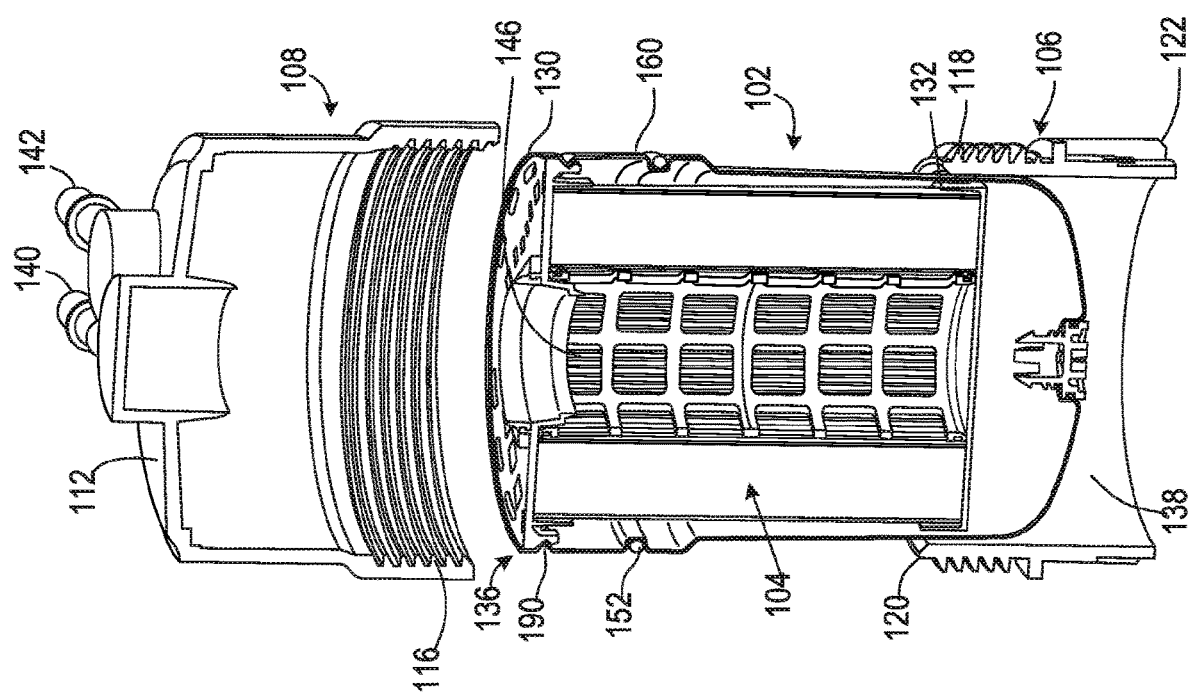

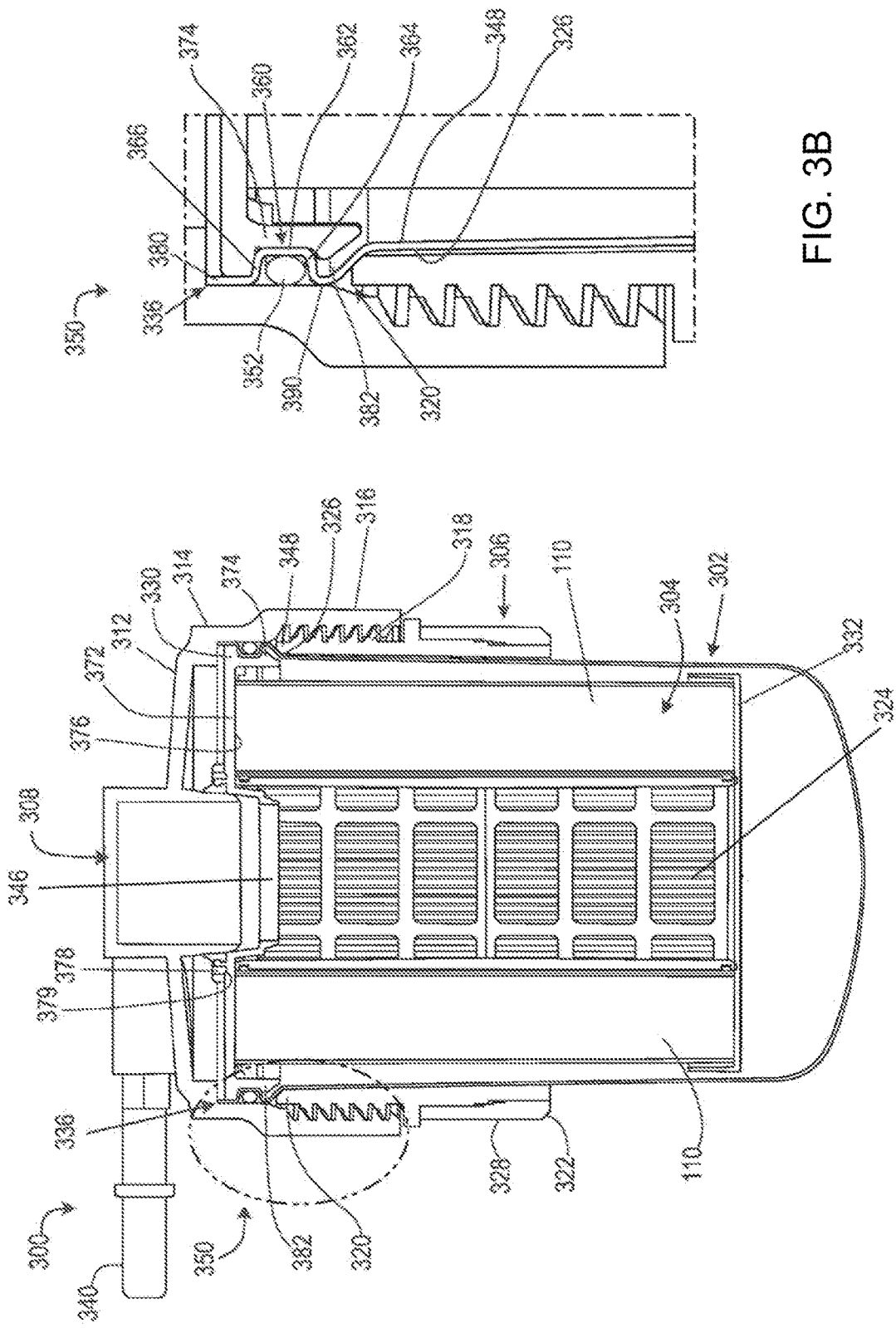

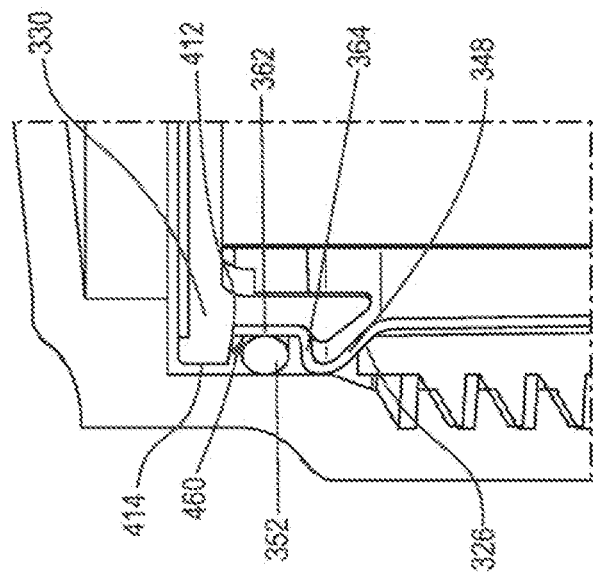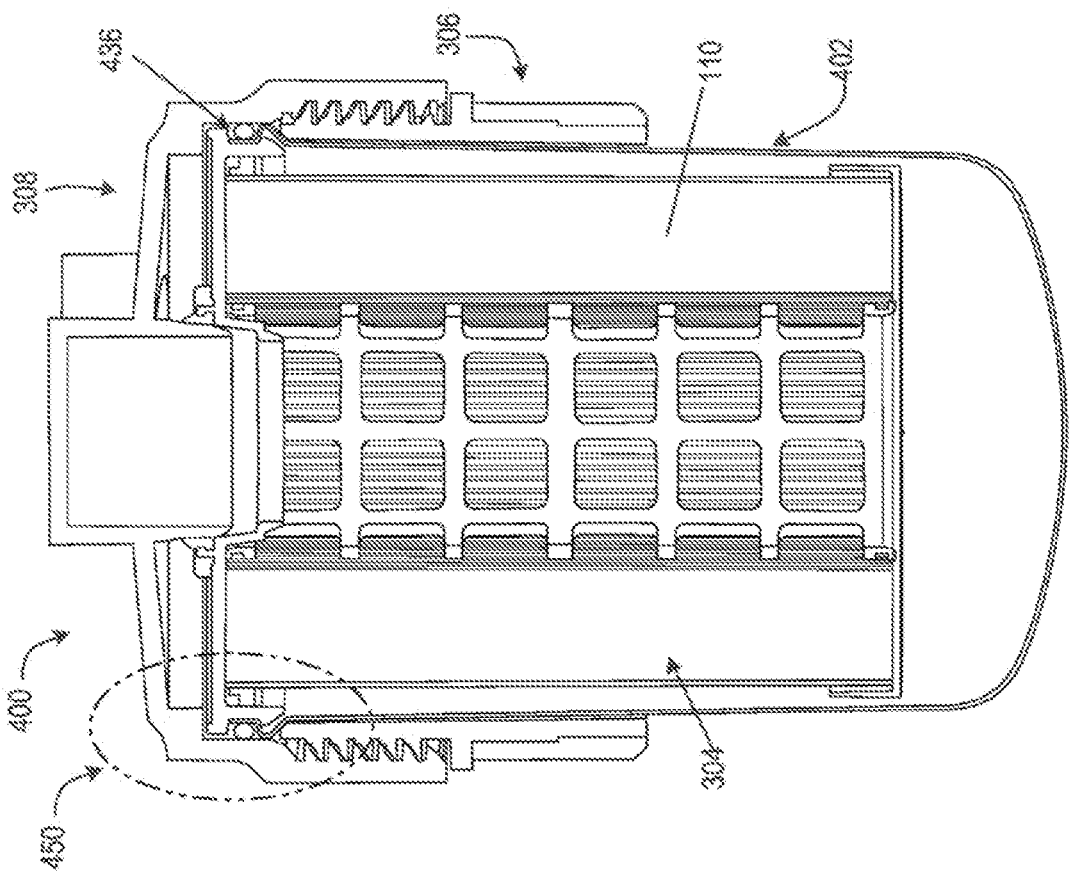
FIG. 4B
FIG. 4A

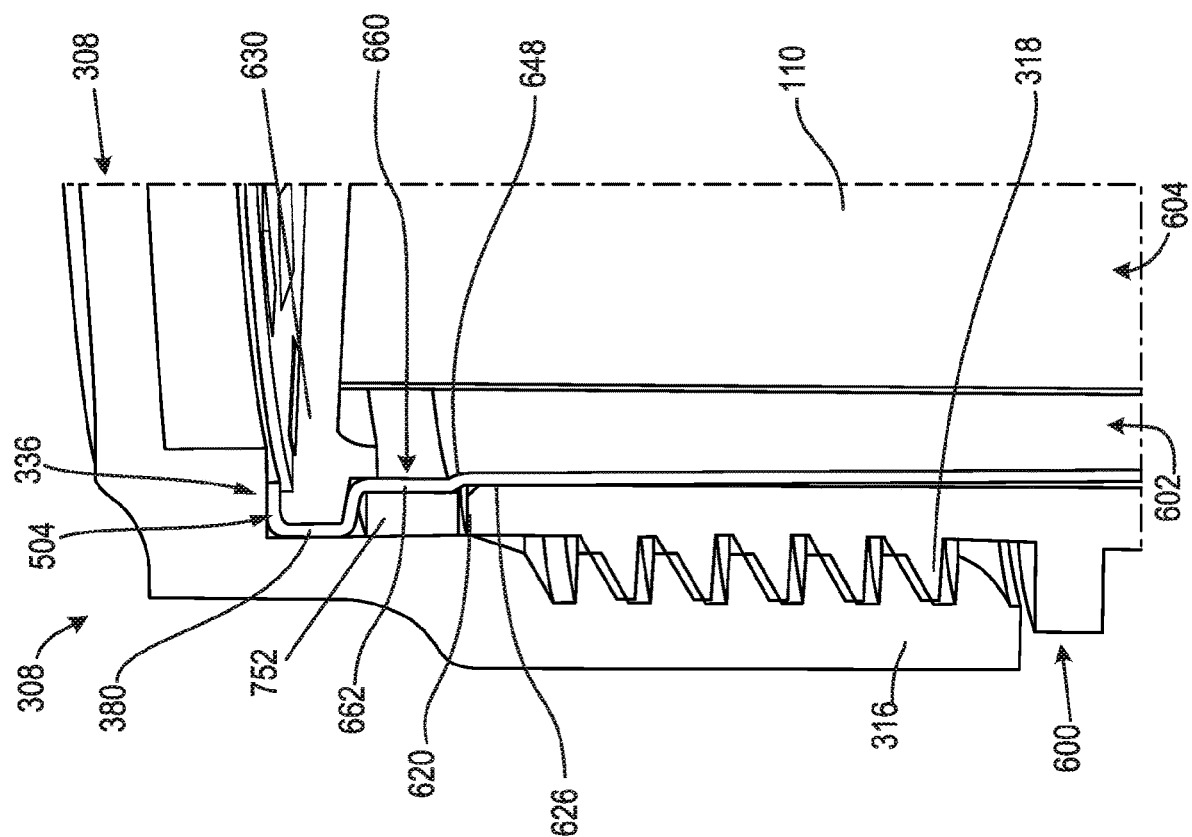

RADIAL SEAL FOR SPIN-ON FILTER

CROSS-REFERENCE TO RELATED APPLICATIONS

The present application is a National Phase of PCT Application No. PCT/IB2019/056208, filed Jul. 19, 2019, which claims priority to U.S. Provisional Application No. 62/702,027, filed on Jul. 23, 2018. The contents of these applications are hereby incorporated by reference in their entirety.

TECHNICAL FIELD

The present application relates to filtration systems.

BACKGROUND

Internal combustion engines generally combust a mixture of fuel (e.g., gasoline, diesel, natural gas, etc.) and air. Lubrication oil is also supplied to the engine to lubricate the various moving components of the engine. Either prior to entering the engine or during engine operation, the intake air, fuel, lubrication oil, and other fluids are typically passed through filtration systems to remove contaminants (e.g., dust, water, oil, etc.) from the fluids. The filtration systems include filter elements having filter media. As the fluid passes through the filter media, the filter media removes at least a portion of the contaminants in the fluid.

Typical spin-on fluid filters are mounted to the mounting head by the use of an internally-threaded metal nut plate. Such nut plates introduce additional parts into the filter assembly and may increase manufacturing complexity and manufacturing cost of such filters. Whether or not the spin-on filter includes a nut plate, sealing must be provided between the head and the filter to prevent leakage outside the filter to environment and provided between the flow inlet and the flow exit to prevent leakage of unfiltered fluid from the inlet to the filtered fluid outlet. The spin-on fluid filters use facial sealing to seal between the head and the filter, which provides sealing as long as the external gasket is able to keep in place under the pressure applied to the gasket.

SUMMARY

Various example embodiments relate to filter elements and filtration systems. A filtration system including a housing defining an internal volume. The housing includes a housing first end, a housing second end, and a first coupling member formed in the housing. The housing first end is an open end. The housing second end is a closed end. A filter element is positioned within the internal volume of the housing. The filter element is configured to engage the first coupling member. A filter head is provided. A seal member is disposed between the housing first end and the housing second end. The seal member provides a radial seal directly between the housing and the filter head.

Various other example embodiments relate to a filtration assembly for engagement with a filter head. A housing defines an internal volume, the housing comprising a housing first end, a housing second end, and a first coupling member formed in the housing, the housing first end being an open end and the housing second end being a closed end. A filter element is positioned within the internal volume of the housing, the filter element configured to engage the first coupling member. A Seal member is disposed between the housing first end and the housing second end, the seal member providing a radial seal directly between the housing and the filter head.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 1A shows a cross-sectional side view of a filtration system according to an example embodiment.

FIG. 1B shows a cross-sectional view of a portion of the radial seal formed in the filtration system of FIG. 1A FIG. 1C shows an exploded cross-sectional view of the filtration system of FIG. 1A.

FIG. 3A shows a cross-sectional side view of a filtration system according to another example embodiment.

FIG. 3B shows a cross-sectional view of a portion of the radial seal formed in the filtration system of FIG. 3A.

FIG. 4A shows a cross-sectional side view of a filtration system according to yet another example embodiment.

FIG. 4B shows a cross-sectional view of a portion of the radial seal formed in the filtration system of FIG. 4A.

FIG. 7 shows a cross-sectional view of a portion of a radial seal formed in a filtration system according to an even further example embodiment.

DETAILED DESCRIPTION

Figure 2:
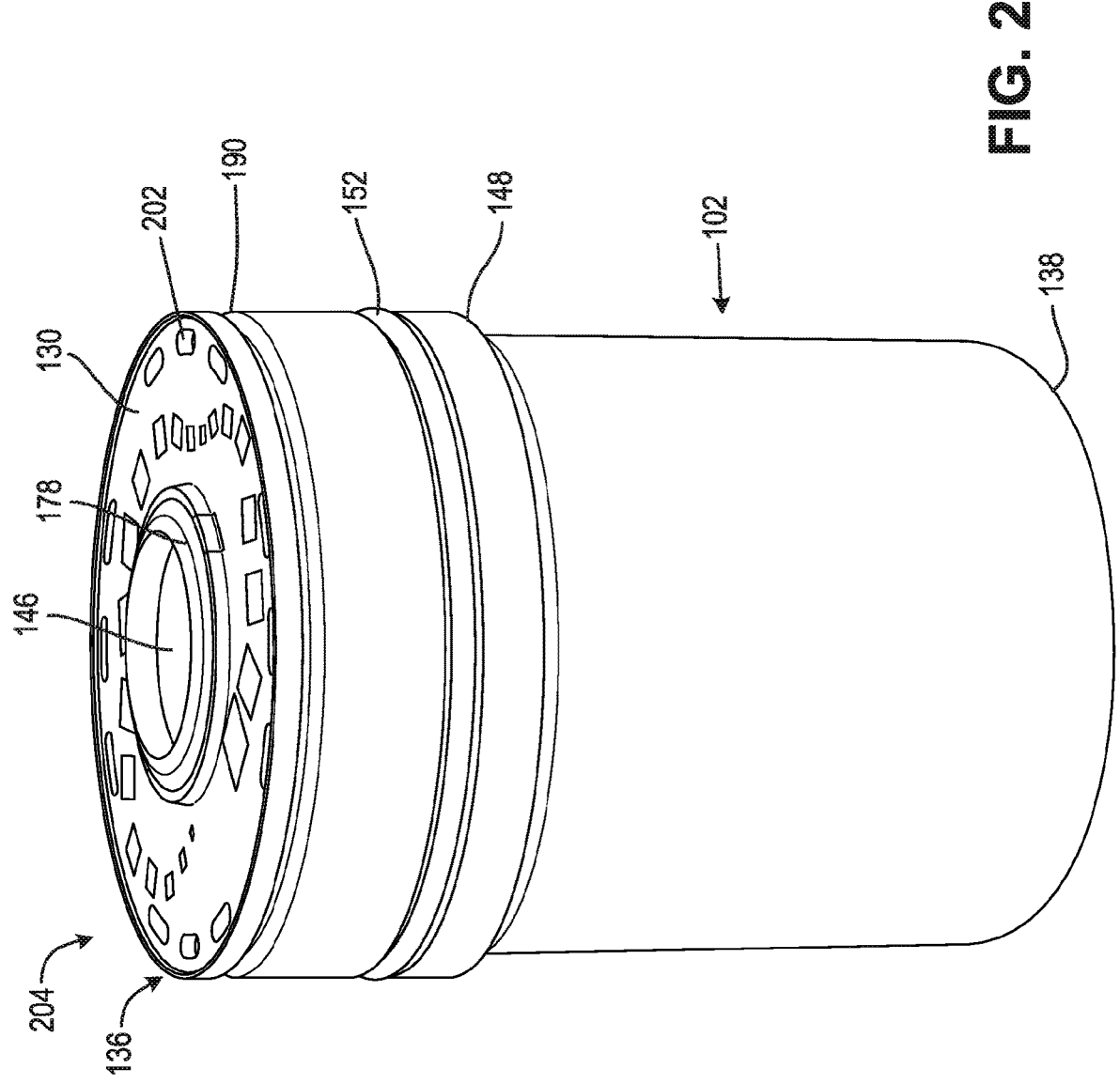
FIG. 2 shows a perspective view of the housing and a seal member of FIG. 1A.

Referring to the figures generally, a spin-on filtration system that includes a seal member that provides a radial seal directly between the shell housing and the filter head. The shell housing may include a seal member in the form of a radial seal gasket that provides a dedicated interface with the filter head. The seal member may be disposed at a wide variety of locations along the shell housing to sealingly engage the filter head. For example, the seal member may be disposed at a specific height to accommodate various filtration operation pressures. In some embodiments, the spin-on filter element includes a snap feature that allows for ease of service of the filter element. Beneficially, the seal member does not require a nut plate or additional parts to provide additional sealing between the shell housing and the filter head and no seaming operation on the shell housing. Further, the seal member allows for the top of the filter element and/or filtration system to be open for fluid passage in some embodiments. Contrary to facial sealing, the pressure limit of the radial seal provided by the seal member is not limited by the ability of the gasket to keep in place under pressure.

FIG. 1A is a cross-sectional side view of a filtration system 100. FIG. 1B is cross-sectional view of a portion 150 of the filtration system 100 of FIG. 1A. FIG. 1C is an exploded perspective view of a filtration system 100. In the embodiment shown in FIGS. 1A-C, the filtration system 100 is a fuel filter for the filtration of fuel. However, the filtration system 100 is not limited to the filtration of fuel and may be used for the filtration of other fluids, such as lube, oil, air, or the like. For example, the filtration system 100 may be configured to remove water contained in a fuel, such as a diesel fuel, before the fuel is introduced into an engine, such as a diesel engine. In addition, the filtration system 100 is not limited to the use of a fuel water separator filter and may be alternatively configured to function as different types of filters, including, but not limited to, suction side filters. The filtration system 100 includes a filter element 104 disposed within a housing 102, with an adapter 106 configured to engage the housing 102 with a filter head 108.

The filter head 108 includes a fluid inlet 140, which allows a fluid to be filtered to flow into the filter element 104, and a fluid outlet 142, which allows a filtered fluid to flow out of the filter element 104. The filter head 108 includes a filter head base 112 and a filter head sidewall 114 extending from an outer periphery of the filter head base 112. The filter head sidewall 114 extends from an outer periphery of the filter head base 112 towards the housing 102. The filter head 108 has first thread 116 on an inner surface of the filter head sidewall 114. The first thread 116 is structured to removably engage a second thread 118 of the adapter 106, such that the filter head 108 is removably coupled to an adapter first end 120 of the adapter 106.

The adapter 106 is configured to couple the housing 102 to the filter head 108 and the filter element 104. The adapter 106 includes the second thread 118 disposed externally on an outer surface adjacent to the adapter first end 120, a second coupling member 126 disposed internally around the adapter first end 120, and a plurality of indentations 128 disposed externally on an adapter second end 122. In some arrangements, the second coupling member 126 comprises a male coupling member of a male-female coupling member pair, configured to receive a corresponding female coupling member (e.g., the first coupling member 148) of the housing 102.

Generally, the adapter 106 first receives the housing 102, whereby the adapter 106 is positioned circumferentially around the middle portion of the housing 102 (with the middle portion being substantially between the housing first end 136 and housing second end 138). The second coupling member 126 is structured to couple with the first coupling member 148 of the housing 102. The first coupling member 148 comprises a complementary angled surface disposed around the middle of the housing 102 on an external wall. The second coupling member 126 may be formed during injection of the adapter 106. In some arrangements, the second coupling member 126 comprises a male detent element. The connection between the adapter 106 and the housing 102, however, is not particularly limited to the use of a detent element and may be any other appropriate detachable connections, such as a snap-fit connection or the like. The first coupling member 148 may be formed during a deep draw machining process used to form the housing 102.

The second thread 118 comprises an externally facing thread disposed on an outer wall of the adapter 106 adjacent to the adapter first end 120 and structured to engage with the first thread 116 of the filter head 108. The second thread 118 extends radially outward. In some arrangements, the threaded design is that of a buttress design, whereby the threads are positivity fixed by the threads disposed on the filter head 108. The second thread 118 may be formed during a deep draw machining process used to form the adapter 106. In some arrangements, the second thread 118 includes two threads per turn. The connection between the adapter 106 and the filter head 108, however, is not particularly limited to the use of a threaded connection and may be any other appropriate detachable connections, such as a snap-fit connection or the like.

The filter element 104 is received in a central compartment formed by the housing 102. The filter element 104 includes a first endplate 130, a second endplate 132, and filter media 110 positioned between the first endplate 130 and the second endplate 132. The filter media 110 is arranged in a cylindrical manner between the first endplate 130 and the second endplate 132 that is configured to filter the fluid. The filter media 110 comprises a porous material having a predetermined pore size and is configured to filter particulate matter from a fluid such as air flowing therethrough. The filter media 110 may comprise pleated media, corrugated media, fluted media, or the like. Disposed within the center of the filter media 110 may be a center tube 124. The center tube 124 may be configured to support the filter media 110 and/or allow the flow of fluid through the filter media 110. The center tube 124 may comprise a plurality of apertures so as to allow the fluid (e.g., air, fuel, oil etc.) to flow into the filter channel after passing through the filter media 110. The center tube 124 may be formed from plastic, metals or any other suitable material. An assembled front plan view of the filtration system 100 of FIG. 1A is shown.

As shown in FIG. 1A, the first endplate 130 is an open endplate that includes a central opening 146 in fluid communication with the fluid outlet 142. The second endplate 132 is a closed endplate. The first endplate 130 includes at least one inlet opening in fluid communication with the fluid inlet 140. In some arrangements, one or both of the first endplate 130 and second endplate 132 may include raised tabs extending from a surface. The tabs may be evenly spaced at the same radius from a center point of the first endplate 130 and second endplate 132 such that the tabs fall along the circle defined by the radius and the center point.

The first endplate 130 includes a top surface 172 and a bottom surface 176. The top surface 172 and bottom surface 176 are parallel, or substantially parallel to each other, and are displaced from each other. The first endplate 130 includes a gasket 178 within the inner gasket retaining wall 179 extending from the top surface 172. In some embodiments, the gasket 178 comprises a plastic nut ring with an external thread to attach to a portion of the filter head 108. In other embodiments, the gasket 178 comprises a plastic seal member that is formed with the filter element 104 or the filter head 108. A second axially protruding flange 180 extends downward from the bottom surface 176. A first axially protruding flange 174 extends downward from the top surface 172, with a radially protruding wall 182 along the surface of first axially protruding flange 174. In some embodiments, the first axially protruding flange 174 is flexible in the radial direction toward the filter media 110. In some arrangements, the first axially protruding flange 174 and/or the radially protruding wall 182 is continuous around a circumference of the filter element 104. The radially protruding wall 182 comprises a shape (e.g., triangular, rectangular, obtuse, angled, etc.) that allows for the first endplate 130 to be vertically pressed down, past the endplate retaining lip 190 thereby causing the first axially protruding flange 174 to flex inward until the first endplate 130 engages the housing 102.

The housing 102 is substantially cylindrical in shape having an open housing first end 136 (e.g., top end) adjacent to first endplate 130 and a closed housing second end 138 (e.g., bottom end) opposite the open top end. As used herein, housing "first end" 136 is intended to refer to the area that includes about twenty percent of the axial distance starting from the boundary that forms the top of the housing 102 towards the boundary that forms the bottom of the housing 102. As used herein, housing "second end" 138 is intended to refer to the area that includes about twenty percent of the axial distance starting from the boundary that corresponds to the bottom of the housing 102 towards the boundary that corresponds to the top of the housing 102. In some embodiments, the "closed" housing second end 138 is an open end of the housing 102 that is closed by a separate removable element, such as a fluid collection bowl. In such embodiments, the separate removable element may be attached to the housing end through complementary threaded (e.g., screwed on/off) portions, snap fit features, press-fit feature, or similar attachment features on the housing end and the removable element. The housing 102 defines an internal volume within which the filter element 104 is positioned. The housing 102 may be formed from a strong and rigid material, for example plastics (e.g., polypropylene, high density polyethylene, polyvinyl chloride, etc.), metals (e.g., aluminum, stainless steel, etc.), or any other suitable material. In particular embodiments, the housing 102 may comprise a cylindrical housing having generally a circular cross-sectional. In other embodiments, the housing 102 may have any suitable shape, for example square, rectangular, polygonal, etc.

The second end 138 may include a biasing member (e.g., a spring) 144 between the housing second end 138 and a location to receive the filter element 104 that is structured to facilitate the "snap-in" installation of the filter element 104 into the housing 102. In some arrangements, the closed bottom end includes a closeable drain opening, a sensor port, or another opening that can be selectively sealed. The housing 102 is structured to engage the adapter 106 such that the adapter 106 snap fits onto the housing 102 and threadedly engage with the filter head 108 of the filtration system 100. In some embodiments, the housing 102 and the adapter 106 are formed as one component. Beneficially, the adapter 106 and the housing 102 are locked together to impede vertical movement and rotation between the adapter 106 and the shell housing 102.

The middle portion of the housing 102 includes the first coupling member 148 on an outer surface thereof. In some arrangements, the first coupling member 148 comprises a female end of a male-female coupling member pair, configured to receive a corresponding male coupling member (e.g., the second coupling member 126 of the adapter 106). Disposed between the first coupling member 148 and the housing first end 136 is a seal member 152 that provides a radial seal with the housing 102 and the filter head 108. The portion 150 of the filtration system 100 that supports the seal member 152 is the seal member channel 160. The seal member channel 160 includes a first retaining lip 166, a retaining wall 162, and a second retaining lip 164. The first retaining lip 166, retaining wall 162, and second retaining lip 164 form a 90-degree rotated, "U"-shaped channel in the housing 102. In some embodiments, the seal member 152 is a circular (e.g., ring) radial seal member.

During assembly, the filter element 104 is disposed within the central compartment of the housing 102. The seal member 152 is disposed within the seal member channel 160 on the housing 102. The filter head 108 receives the adapter 106, whereby the filter head 108 is circumferentially around the adapter first end 120 and the housing 102 is sealingly engaged with the filter head 108. Upon installation of the adapter 106 into the filter head 108, the filter head 108, adapter 106, housing 102, and filter element 104 are all removably coupled and form a "leak-tight" seal in various locations to facilitate the intake, filtering, and outflow of a fluid. A seal member 152 provides a radial seal with the filter head 108 and the housing 102.

FIG. 2 shows a perspective view of the spin-on arrangement of the filter assembly 204 that includes the housing 102 (e.g., shell housing) and the filter element 104. The seal member 152 extends circumferentially around the housing 102. In some embodiments, the filter element 104 is permanently affixed or installed within the housing 102. As shown in FIG. 2, a plurality of fluid openings 202 are disposed around the top surface 172 of the first endplate 130.

Turning to FIG. 3A, a cross-sectional side view of a filtration system 300 is shown, according to an example embodiment. FIG. 3B is cross-sectional view of a portion 350 of the filtration system 300 of FIG. 3A. The filtration system 300 may be a fuel filtration system, a lubricant filtration system, a hydraulic fluid filtration system, a water filtration system, or the like. The filtration system 300 is similar to the filtration system 100 of FIG. 1A. A difference between the filtration system 300 and the filtration system 100 is the location of the seal member 352 and seal member channel 360. Accordingly, like numbering is used to designate similar components between the filtration system 100 and the components shown in FIGS. 3A and 3B.

The filter head 308 includes a fluid inlet 340, which allows a fluid to be filtered to flow into the filter element 304, and a fluid outlet, which allows a filtered fluid to flow out of the filter element 304. The filter head 308 includes a filter head base 312 and a filter head sidewall 314 extending from an outer periphery of the filter head base 312. The filter head sidewall 314 extends from an outer periphery of the filter head base 312 towards the housing 302. The filter head 308 has first thread 316 on an inner surface of the filter head sidewall 314. The first thread 316 is structured to removably engage a second thread 318 of the adapter 306, so as to be coupled to an adapter first end 320.

The adapter 306 is configured to couple the housing 302 to the filter head 308 and the filter element 304. The adapter 306 includes a second thread 318 disposed externally on an outer surface adjacent to the adapter first end 320, a second coupling member 326 disposed internally around the adapter first end 320, and a plurality of indentations 328 disposed externally on an adapter second end 322. In some arrangements, the second coupling member 326 comprises a male coupling member of a male-female coupling member pair, configured to receive a corresponding female coupling member (e.g., the first coupling member 348) of the housing 302. A difference between the adapter 106 of FIG. 1A and the adapter 306 of FIG. 3A is the adapter first end 320 of FIG. 3A is adjacent to (e.g., near) the housing first end 336. The second coupling member 326 is structured to couple with the first coupling member 348 of the housing 302. The first coupling member 348 comprises a complementary angled surface disposed around the housing first end 336 on an external wall. Notably, the first coupling member 348 is disposed below a seal member channel 360 that receives the seal member 352. In some arrangements, the second coupling member 326 comprises a male detent element. The second thread 318 comprises an externally facing thread disposed on an outer wall of the adapter 306 adjacent to the adapter first end 320 and structured to engage with the first thread 316 of the filter head 308. The second thread 318 extends radially outward.

The filter element 304 is received in a central compartment formed by the housing 302. The filter element 304 includes a first endplate 330, a second endplate 332, and filter media 110 positioned between the first endplate 330 and the second endplate 332. The filter media 110 is arranged in a cylindrical manner between the first endplate 330 and the second endplate 332 that is configured to filter the fluid. The filter media 110 comprises a porous material having a predetermined pore size and is configured to filter particulate matter from a fluid such as air flowing therethrough. The filter media 110 may comprise pleated media, corrugated media, fluted media, or the like. Disposed within the center of the filter media 110 may be a center tube 324. The center tube 324 may be configured to support the filter media 110 and/or allow the flow of fluid through the filter media 110. The center tube 324 may comprise a plurality of apertures so as to allow the fluid (e.g., air, fuel, oil etc.) to flow into the filter channel after passing through the filter media 110. The center tube 324 may be formed from plastic, metals or any other suitable material. an assembled front plan view of the filtration system 300 of FIG. 3A is shown.

As shown in FIG. 3A, the first endplate 330 is an open endplate that includes a central opening 346 in fluid communication with the fluid outlet 342. The second endplate 332 is a closed endplate. The first endplate 330 includes at least one inlet opening in fluid communication with the fluid inlet 340. In some arrangements, one or both of the first endplate 330 and second endplate 332 may include raised tabs extending from a surface. The tabs may be evenly spaced at the same radius from a center point of the first endplate 330 and second endplate 332 such that the tabs fall along the circle defined by the radius and the center point.

The first endplate 330 includes a top surface 372 and a bottom surface 376. The top surface 372 and bottom surface 376 are parallel, or substantially parallel to each other, and are displaced from each other. The first endplate 330 includes a gasket 378 within the inner gasket retaining wall 379 extending from the top surface 372. In some embodiments, the gasket 378 comprises a plastic nut ring with an external thread to attach to a portion of the filter head 308. In other embodiments, the gasket 378 comprises a plastic seal member that is formed with the filter element 304 or the filter head 308. A first axially protruding flange 374 extends downward from the bottom surface 376, with a radially protruding wall 382 along the surface of the first axially protruding flange 374. In some embodiments, the first axially protruding flange 374 is flexible in the radial direction toward the filter media 110. In some arrangements, the first axially protruding flange 374 and/or the radially protruding wall 382 is continuous around a circumference of the filter element 304. The radially protruding wall 382 comprises a shape (e.g., triangular, rectangular, obtuse, angled, etc.) that allows for the first endplate 330 to be vertically pressed down, past the endplate retaining lip 390 thereby causing the first axially protruding flange 374 to flex inward until the first endplate 330 engages the housing 302.

The housing first end 336 includes the first coupling member 348 on an outer surface thereof. In some arrangements, the first coupling member 348 comprises a female end of a male-female coupling member pair, configured to receive a corresponding male coupling member (e.g., the second coupling member 326 of the adapter 306). Disposed between the first coupling member 348 and the housing first end 336 is a seal member 352 that provides a radial seal with the housing 302 and the filter head 308. The portion 350 of the filtration system 300 that supports the seal member 352 is the seal member channel 360. Notably, the seal member channel 360 is adjacent to the endplate retaining lip 390 and close to the adapter 306. The seal member channel 360 includes a second retaining lip 364, a retaining wall 362, and a first retaining lip 366. The first retaining lip 366, retaining wall 362, and second retaining lip 364 form a 90-degree rotated, "U"-shaped channel in the housing 302. In some embodiments, the seal member 352 is a circular (e.g., ring) radial seal member. An axial flange 380 extends from the first retaining lip 366 toward the housing first end 336.

During assembly, the filter element 304 is disposed within the central compartment of the housing 302. The seal member 352 is disposed within the seal member channel 360 on the housing 302. The filter head 308 receives the adapter 306, whereby the filter head 308 is circumferentially around the adapter first end 320 and the housing 302 is sealingly engaged with the filter head 308. Upon installation of the adapter 306 into the filter head 308, the filter head 308, adapter 306, housing 302, and filter element 304 are all removably coupled and form a "leak-tight" seal in various locations to facilitate the intake, filtering, and outflow of a fluid. A seal member 352 provides a radial seal with the filter head 308 and the housing 302 towards the housing first end 336.

Turning to FIG. 4A, a cross-sectional side view of a filtration system 400 is shown, according to an example embodiment. FIG. 4B is cross-sectional view of a portion 450 of the filtration system 400 of FIG. 4A. The filtration system 400 may be a fuel filtration system, a lubricant filtration system, a hydraulic fluid filtration system, a water filtration system, or the like. The filtration system 400 is similar to the filtration system 300 of FIG. 3A. A difference between the filtration system 400 and the filtration system 300 is the shape of the housing first end 436 and the seal member channel 460. Accordingly, like numbering is used to designate similar components between the filtration system 300 and the components shown in FIGS. 4A and 4B.

Referring to portion 450, the housing 402 has a shorter axial height compared to the housing 302 in FIG. 3A. Specifically, the housing 402 does not include the axial flange 380 or first retaining lip 366 of the housing 302. The seal member channel 460 is formed by the second retaining lip 364, the retaining wall 362, and a bottom edge surface 412 of the first endplate 330. Beneficially, the seal member 352 may be installed prior to inserting the filter element 304 into the housing 402, thereby removing the need to stretch the seal member 352 around a larger diameter (e.g., the diameter of the first endplate 330) as in the filtration system 300. Additionally, unlike the first endplate 330 in the filtration system 300 that has the housing 302 between the first endplate 330 and the filter head 308, the first endplate 330 of the filtration system 400 has a side wall 414 that is adjacent to the filter head 308. In some embodiments, the seal member 352 is a circular (e.g., ring) radial seal member.

Figure 5:
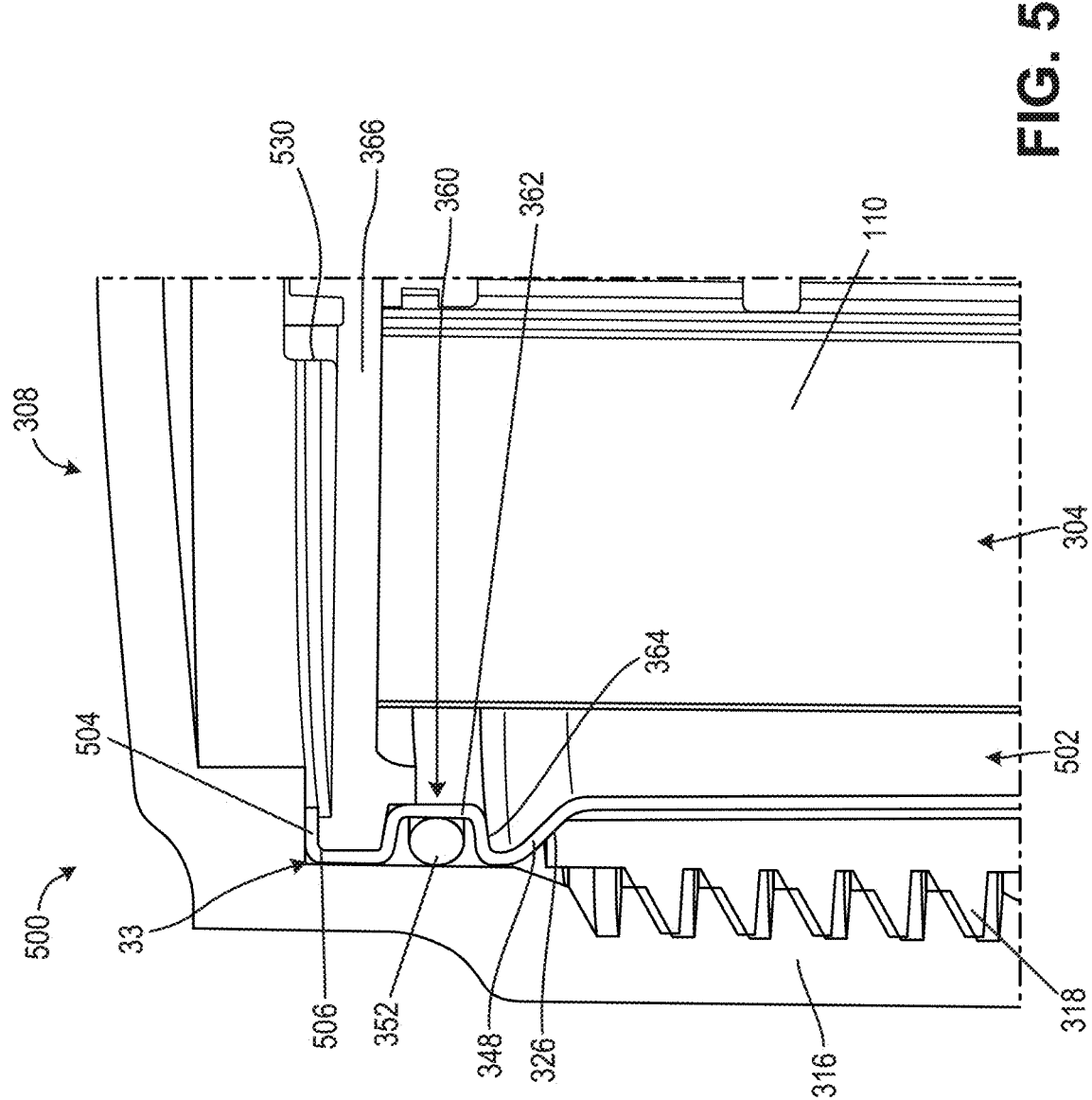
FIG. 5 shows a cross-sectional view of a portion of a radial seal formed in a filtration system according to an example embodiment.

Turning to FIG. 5, a cross-sectional view of a portion of a filtration system 500 is shown, according to an example embodiment. The filtration system 500 may be a fuel filtration system, a lubricant filtration system, a hydraulic fluid filtration system, a water filtration system, or the like. The filtration system 500 is similar to the filtration system 300 of FIG. 3A. A difference between the filtration system 500 and the filtration system 300 is the shape of the housing first end 536 and the first endplate 530. Accordingly, like numbering is used to designate similar components between the filtration system 300 and the components shown in FIG. 5.

The housing 502 includes an endplate retaining lip 504 on the housing first end 336. The housing further includes a top channel portion 506 extending from the retaining lip (e.g., which may be the same as or similar to the retaining lip 366 of FIG. 3B) and covering a portion of the top surface of the first endplate 530. In these embodiments, the filter element 304 cannot be removed from the housing 502. The housing 502 retaining and securing the filter element 304 provides a "complete servicing filter" for use in the filtration system 500. The housing first end 336 may be pushed or moved to adjust the filter element 304 within the housing 502. In some embodiments, the seal member 352 is a circular (e.g., ring) radial seal member. A difference between the first endplate 330 and the first endplate 530 is that the first endplate 530 does not have axial protrusions from the top or bottom surface. As will be readily apparent, the first endplate 530 does not snap-fit with a ridge on an internal surface of the housing 602. However, the first endplate 630 (and by way the filter element 304) is fixed within the housing 603 due to the endplate retaining lip 504.

Figure 6:
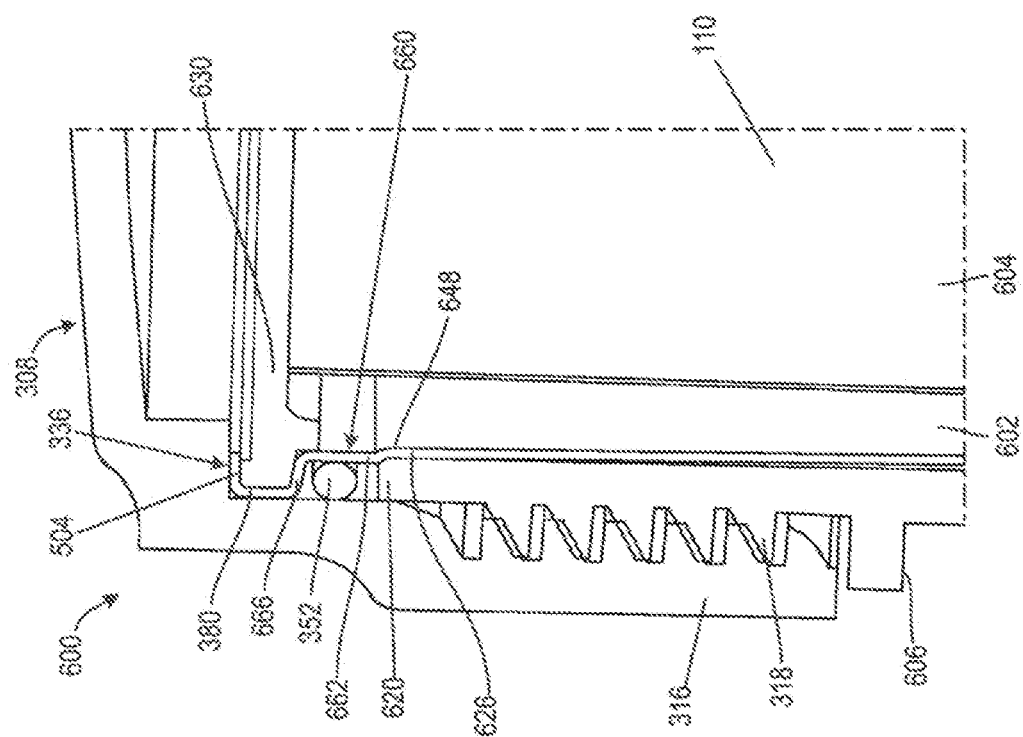
FIG. 6 shows a cross-sectional view of a portion of a radial seal formed in a filtration system according to yet another example embodiment.

Turning to FIG. 6, a cross-sectional view of a portion of a filtration system 600 is shown, according to an example embodiment. The filtration system 600 may be a fuel filtration system, a lubricant filtration system, a hydraulic fluid filtration system, a water filtration system, or the like. The filtration system 600 is similar to the filtration system 500 of FIG. 5. A difference between the filtration system 600 and the filtration system 500 is the shape of the first coupling member 648, the first endplate 630, the adapter 606, and the seal member channel 660 in the filtration system 600. Accordingly, like numbering is used to designate similar components between the filtration system 500 and the components shown in FIG. 6.

The adapter 606 includes the second thread 318 disposed externally on an outer surface adjacent to the adapter first end 620, a second coupling member 626 disposed internally around the adapter first end 620, and a plurality of indentations 328 disposed externally on an adapter second end 622. In some arrangements, the second coupling member 626 comprises a male coupling member of a male-female coupling member pair, configured to receive a corresponding female coupling member (e.g., the first coupling member 648) of the housing 602. Similar to the adapter 306 of FIG. 3A, the adapter 606 of FIG. 6 is positioned circumferentially around and adjacent to the housing first end 336. The second coupling member 626 is structured to couple with the first coupling member 648 of the housing 602. The first coupling member 648 comprises a complementary angled surface disposed around the housing first end 336 on an external wall. In some arrangements, the second coupling member 626 comprises a male detent element.

The housing 602 includes an endplate retaining lip 504 on the housing first end 336. In these embodiments, the filter element 604 cannot be removed from the housing 602. The housing 602 retaining and securing the filter element 604 provides a "complete servicing filter" for use in the filtration system 600. The housing first end 336 may be pushed or moved to adjust the filter element 604 within the housing 602. An axial flange 380 extends from the first retaining lip 666 toward the endplate retaining lip 504. The first endplate 630 is similar to the first endplate 330. A difference between the first endplate 330 and the first endplate 630 is that the first endplate 630 does not have axial protrusions from the top or bottom surface. As will be readily apparent, the first endplate 630 does not snap-fit with a ridge on an internal surface of the housing 602. However, the first endplate 630 (and by way the filter element 604) is fixed within the housing 602 due to the endplate retaining lip 504.

The housing first end 336 includes the first coupling member 648 on an outer surface thereof. In some arrangements, the first coupling member 648 comprises a female end of a male-female coupling member pair, configured to receive a corresponding male coupling member (e.g., the second coupling member 626 of the adapter 606). Disposed between the first coupling member 648 and the housing first end 336 is the seal member 352 that provides a radial seal with the housing 602 and the filter head 308. In some embodiments, the seal member 352 is a circular (e.g., ring) radial seal member. A seal member channel 660 is adjacent to the endplate retaining lip 690 and the adapter 606 and is configured to receive the seal member 352. The seal member channel 660 includes the first retaining lip 666 and a retaining wall 662. The first retaining lip 666 and the retaining wall 662 form an "L"-shaped channel in the housing 602. In some embodiments, the seal member channel 660 may include a stop or similar protrusion to create a constant groove (e.g., constant width) for the seal member 352. The first retaining lip 666, the retaining wall 662, and the adapter first end 620 form a "U"-shaped channel once the filtration system 600 is assembled.

Turning to FIG. 7, a cross-sectional view of a portion of a filtration system 700 is shown, according to an example embodiment. The filtration system 700 may be a fuel filtration system, a lubricant filtration system, a hydraulic fluid filtration system, a water filtration system, or the like. The filtration system 700 is similar to the filtration system 600 of FIG. 6. A difference between the filtration system 700 and the filtration system 600, is the shape of the seal member 752 in the filtration system 700. Accordingly, like numbering is used to designate similar components between the filtration system 600 and the components shown in FIG. 7. The seal member 752 is a rectangular gasket in place of the O-ring gasket shown in FIGS. 1A-6. A rectangular seal member 752 may provide lower manufacturing costs compared to the O-ring seal member 352.

Figure 8B:
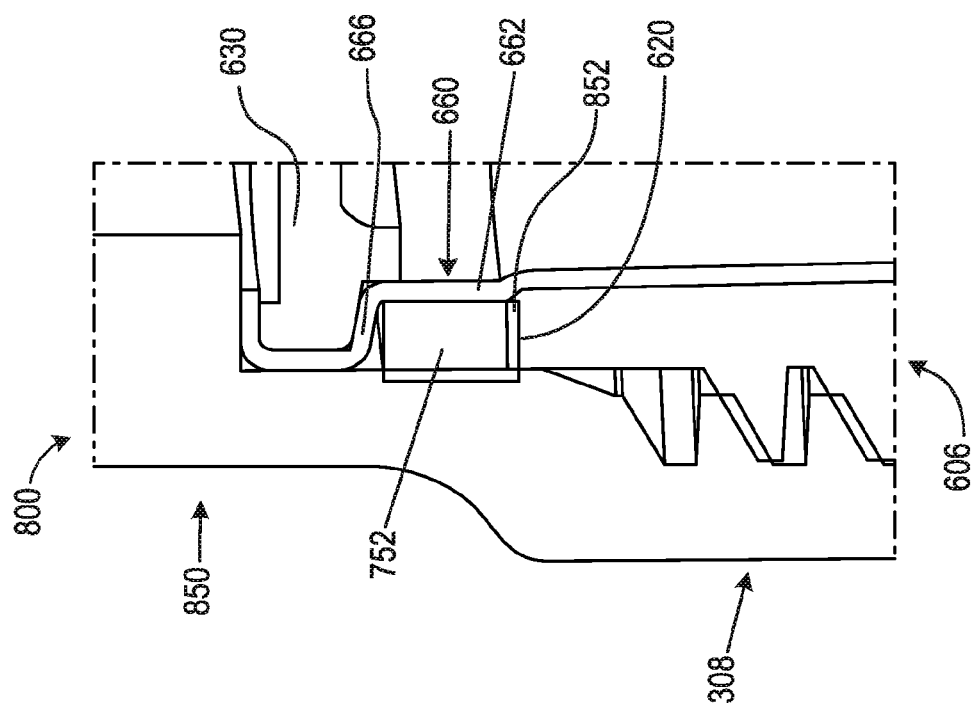
FIG. 8B shows a cross-sectional view a radial seal formed in a filtration system that includes the housing of FIG. 8A.
Figure 8A:
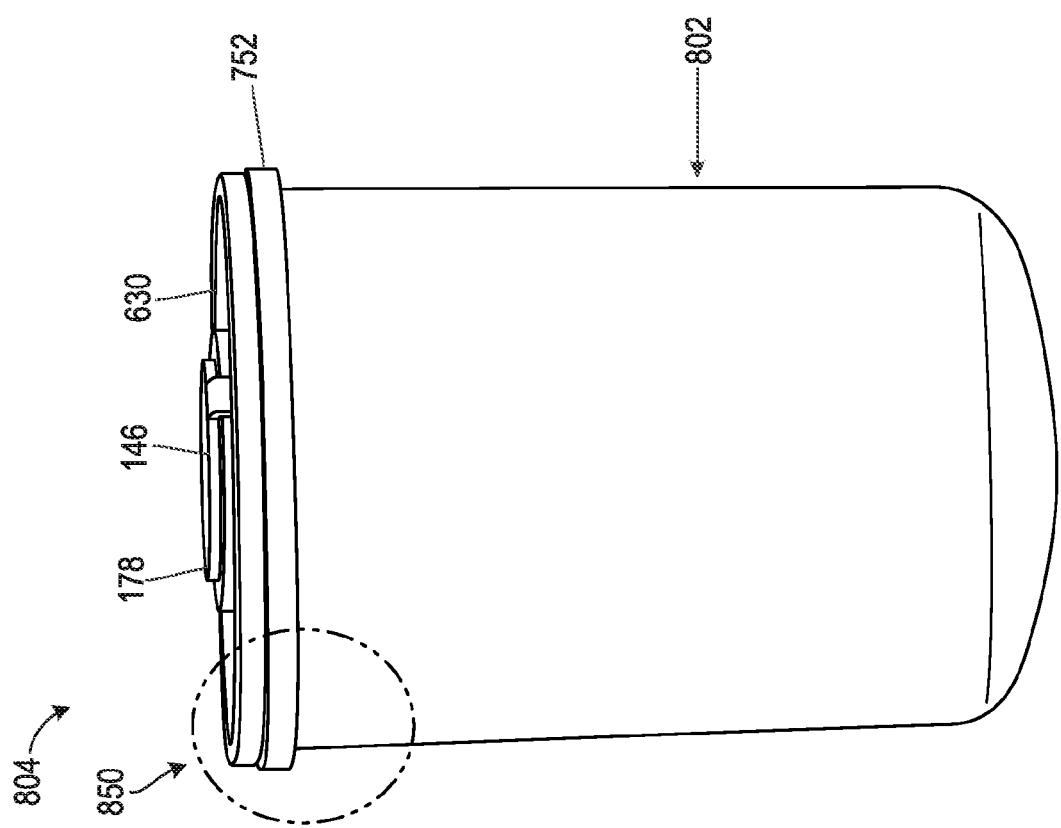
FIG. 8A shows a perspective view of a housing and a seal member according to an example embodiment.

Turning to FIG. 8A, a perspective view of filter assembly 804 including a housing 802 and filter element 304 is shown, according to an example embodiment. FIG. 8B is cross-sectional view of a portion 850 of a filtration system 800 that includes the filter assembly 804 of FIG. 8A. The filtration system 800 may be a fuel filtration system, a lubricant filtration system, a hydraulic fluid filtration system, a water filtration system, or the like. The filtration system 800 is similar to the filtration system 600 of FIG. 6. A difference between the filtration system 800 and the filtration system 600 is a stopping wall 852 disposed between the housing 802 and the adapter 606. Accordingly, like numbering is used to designate similar components between the filtration system 600 and the components shown in FIGS. 8A and 8B.

Similar to the filtration system 700, the filtration system 800 includes the seal member 752 disposed between the adapter first end 620 and the first retaining lip 666 that provides a radial seal with the housing 802 and the filter head 308. In some embodiments, the seal member 752 is a rectangular radial seal member. A seal member channel 660 is adjacent to the endplate retaining lip 690 and the adapter 606 and is configured to receive the seal member 752. The seal member channel 660 includes the first retaining lip 666 and a retaining wall 662. The first retaining lip 666 and the retaining wall 662 form an "L"-shaped channel in the housing 802. A "U"-shaped channel is formed once the filtration system 800 is assembled between the first retaining lip 666, the retaining wall 662, and a stopping wall 852. The stopping wall 852 may include a stop or similar protrusion to create a constant groove (e.g., constant width) for the seal member 752. The stopping wall 852 may maintain the filter assembly 804 within the filter head 308 and the adapter 606 is configured to compress and maintain the seal member 752.

Figure 9A:
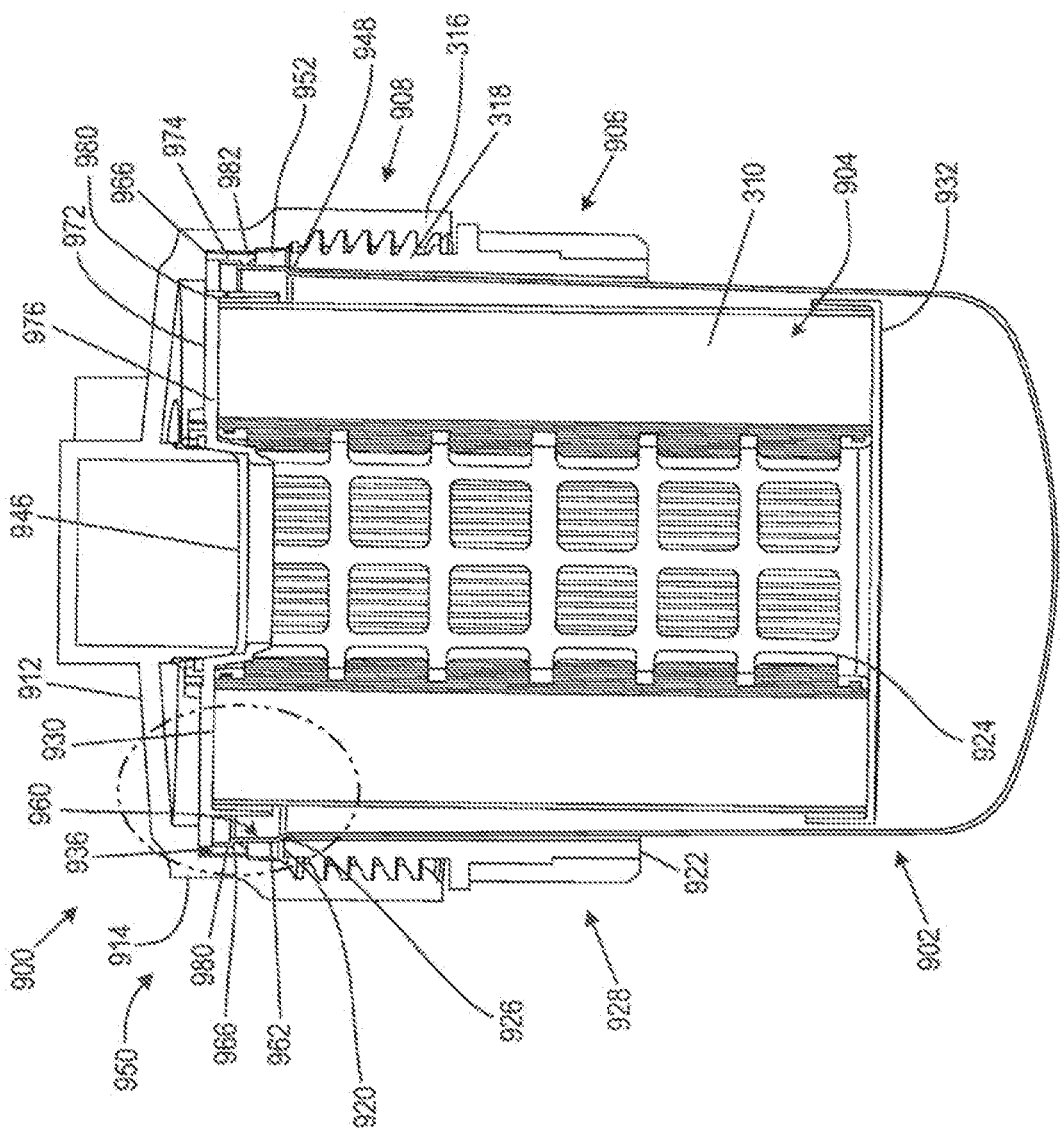
FIG. 9A shows a cross-sectional side view of a filtration system according to a further example embodiment.
Figure 9C:
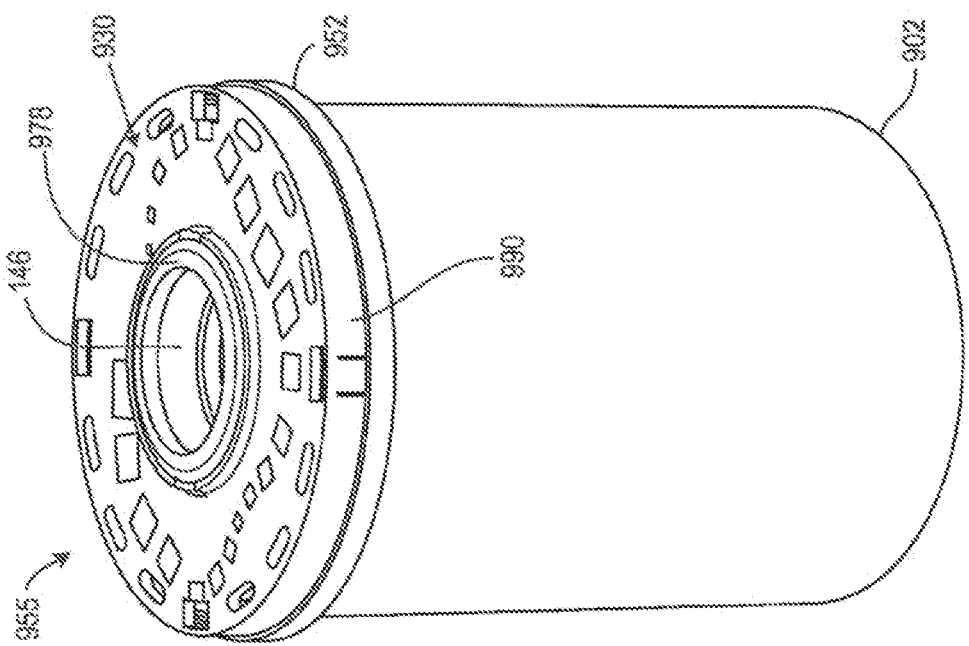
FIG. 9C shows a perspective view of the housing of the filtration system of FIG. 9A.
Figure 9B:
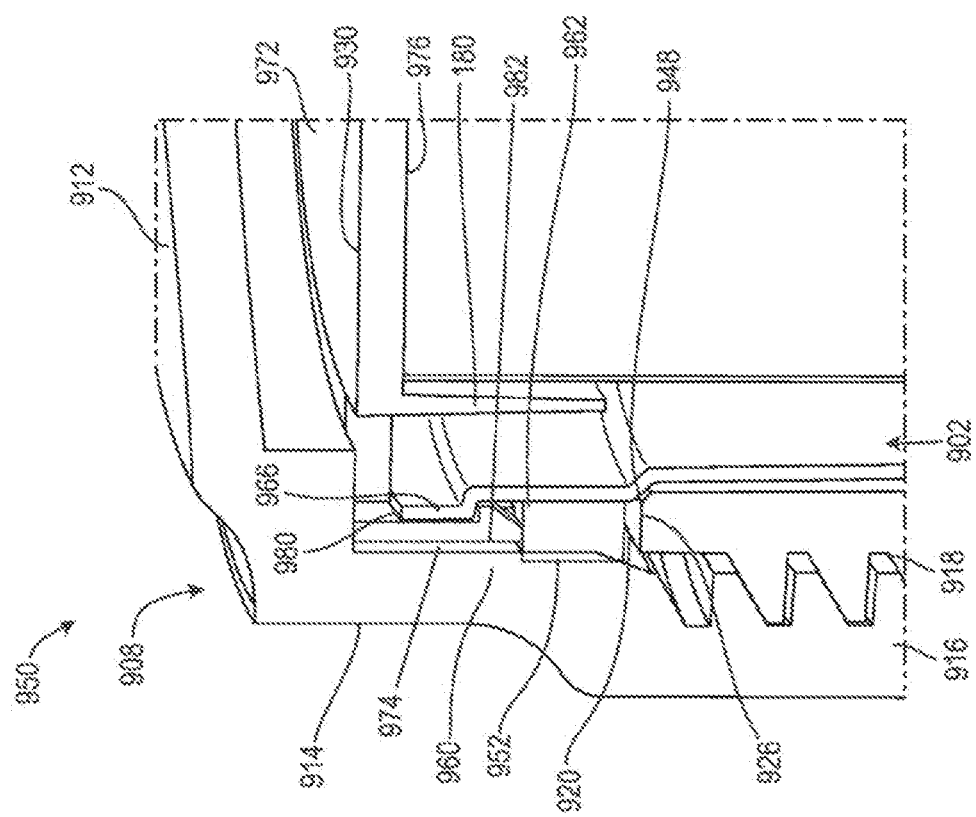
FIG. 9B shows a cross-sectional view of a portion of a radial seal formed in the filtration system of FIG. 9A
Figure 9D:
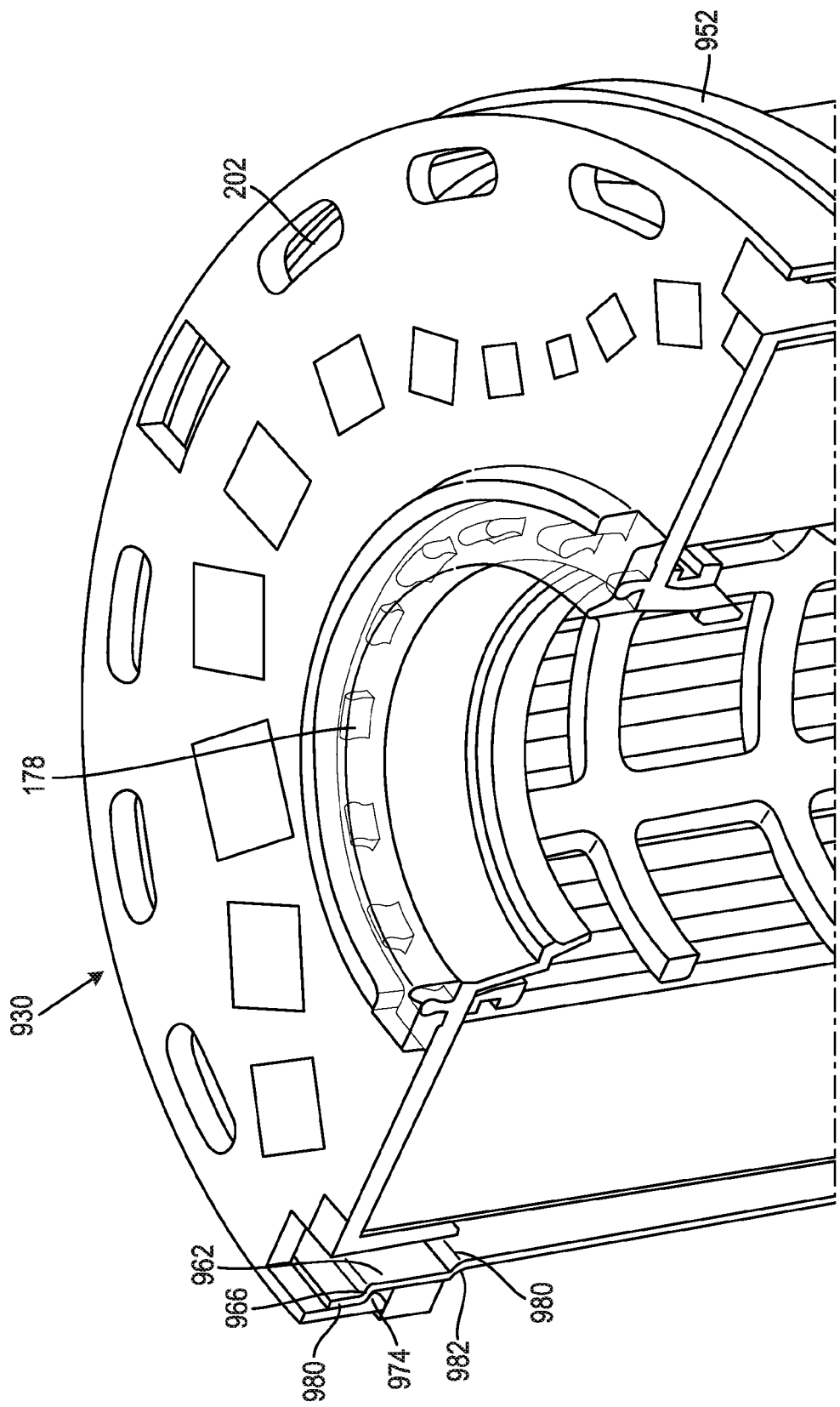
FIG. 9D shows a top perspective, cross-sectional view of the housing of FIG. 9C.

Turning to FIG. 9A, a cross-sectional side view of a filtration system 900 is shown, according to an example embodiment. FIG. 9B is cross-sectional view of a portion 950 of the filtration system 900 of FIG. 9A. FIG. 9C shows a perspective view of the filter assembly 955 that includes the housing 902 and the filter element 904. FIG. 9D shows a cross-sectional, top perspective view of the filter element 904. The filtration system 900 may be a fuel filtration system, a lubricant filtration system, a hydraulic fluid filtration system, a water filtration system, or the like. The filtration system 900 is similar to the filtration system 700 of FIG. 7. A difference between the filtration system 900 and the filtration system 700 is the housing 902 and filter element 904 and the engagement of the two components. Accordingly, like numbering is used to designate similar components between the filtration system 700 and the components shown in FIGS. 9A-9D.

The filter head 908 includes a fluid inlet, which allows a fluid to be filtered to flow into the filter element 904, and a fluid outlet, which allows a filtered fluid to flow out of the filter element 904. The filter head 908 includes a filter head base 912 and a filter head sidewall 914 extending from an outer periphery of the filter head base 912. The filter head sidewall 914 extends from an outer periphery of the filter head base 912 towards the housing 902. The filter head 908 has first thread 916 on an inner surface of the filter head sidewall 914. The first thread 916 is structured to removably engage a second thread 918 of the adapter 906, so as to be coupled to an adapter first end 920.

The adapter 906 is configured to couple the housing 902 to the filter head 908 and filter element 904. The adapter 906 includes a second thread 318 disposed externally on an outer surface adjacent to the adapter first end 920, a second coupling member 926 disposed internally around the adapter first end 920, and a plurality of indentations 928 disposed externally on an adapter second end 922. In some arrangements, the second coupling member 926 comprises a male coupling member of a male-female coupling member pair, configured to receive a corresponding female coupling member (e.g., the first coupling member 948) of the housing 902. The second coupling member 926 is structured to couple with the first coupling member 948 of the housing 902. The first coupling member 948 comprises a complementary angled surface disposed around the housing first end 936 on an external wall. Notably, the first coupling member 948 is disposed below a seal member channel 960 that receives the seal member 952. In some arrangements, the second coupling member 926 comprises a male detent element. The second thread 318 comprises an externally facing thread disposed on an outer wall of the adapter 906 adjacent to the adapter first end 920 and structured to engage with the first thread 316 of the filter head 908. The second thread 318 extends radially outward.

The filter element 904 is received in a central compartment formed by the housing 902. The filter element 904 includes a first endplate 930, a second endplate 932, and filter media 310 positioned between the first endplate 930 and the second endplate 932. One difference between the filter element 904 and the filter element 704 is the first axially protruding flange 974 of the filter element 904 engages with an outer surface of the housing 902 and radially protrudes inward. As shown in FIG. 9A, the first endplate 930 is an open endplate that includes a central opening 946 in fluid communication with the fluid outlet. The second endplate 932 is a closed endplate. The first endplate 930 includes at least one inlet opening (e.g., plurality of fluid openings 202) in fluid communication with the fluid inlet. In some arrangements, one or both of the first endplate 930 and second endplate 932 may include raised tabs extending from a surface. The tabs may be evenly spaced at the same radius from a center point of the first endplate 930 and second endplate 932 such that the tabs fall along the circle defined by the radius and the center point.

The first endplate 930 includes a top surface 972 and a bottom surface 976. The top surface 972 and bottom surface 976 are parallel, or substantially parallel to each other, and are displaced from each other. The first endplate 930 includes a gasket 978 within the inner gasket retaining wall 979 extending from the top surface 972. In some embodiments, the gasket 978 comprises a plastic nut ring with an external thread to attach to a portion of the filter head 908. In other embodiments, the gasket 978 comprises a plastic seal member that is formed with the filter element 904 or the filter head 908. A clip 990 is disposed around the periphery of the top surface 972 and a bottom surface 976 of the first endplate 930. The clip 990 may be configured to snap-fit engage a filter head 908 or similar feature.

A first axially protruding flange 974 extends downward from the edge of the top surface 972 such that the first axially protruding flange 974 is outside of the housing 902 when the housing 902 and the filter element 904 are engaged. A second axially protruding flange 180 extends downward from the bottom surface 976. The first axially protruding flange 974 includes a radially protruding wall 982 along the surface that protrudes inward to engage a first retaining lip 966 of the housing 902. In some embodiments, the first axially protruding flange 974 is flexible in the radial direction away from the filter media 310. In some arrangements, the first axially protruding flange 974 and/or the radially protruding wall 982 is continuous around a circumference of the filter element 904. The radially protruding wall 982 comprises a shape (e.g., triangular, rectangular, obtuse, angled, etc.) that allows for the first endplate 930 to be vertically pressed down, past the first retaining lip 966 thereby causing the first axially protruding flange 974 to flex inward until the first endplate 930 engages the housing 902.

The housing first end 936 includes the first coupling member 948 on an outer surface thereof. In some arrangements, the first coupling member 948 comprises a female end of a male-female coupling member pair, configured to receive a corresponding male coupling member (e.g., the second coupling member 926 of the adapter 906). Disposed between the first coupling member 948 and the housing first end 936 is a seal member 952 that provides a radial seal with the housing 902 and the filter head 908. The portion 950 of the filtration system 900 that supports the seal member 952 is the seal member channel 960. The seal member channel 960 includes a first retaining lip 966, a retaining wall 962, and the adapter first end 920. The first retaining lip 966, retaining wall 962, and the adapter first end 920 form a 90-degree rotated, "U"-shaped channel between the housing 902, filter head 908, and adapter 906. In some embodiments, the seal member 952 is a circular (e.g., ring) radial seal member. An axial flange 980 extends from the first retaining lip 966 toward the housing first end 936.

During assembly, the filter element 904 is disposed within the central compartment of the housing 902. The filter element 904 is snapped on the inner diameter of the housing 902. The seal member 952 is disposed within the seal member channel 960 on the housing 902. The filter head 908 receives the adapter 906, whereby the filter head 908 is circumferentially around the adapter first end 920 and the housing 902 is sealingly engaged with the filter head 908. Upon installation of the adapter 906 into the filter head 908, the filter head 908, adapter 906, housing 902, and filter element 904 are all removably coupled and form a "leak-tight" seal in various locations to facilitate the intake, filtering, and outflow of a fluid. A seal member 952 provides a radial seal with the filter head 908, adapter 906, and the housing 902 towards the housing first end 936.

Figure 10:
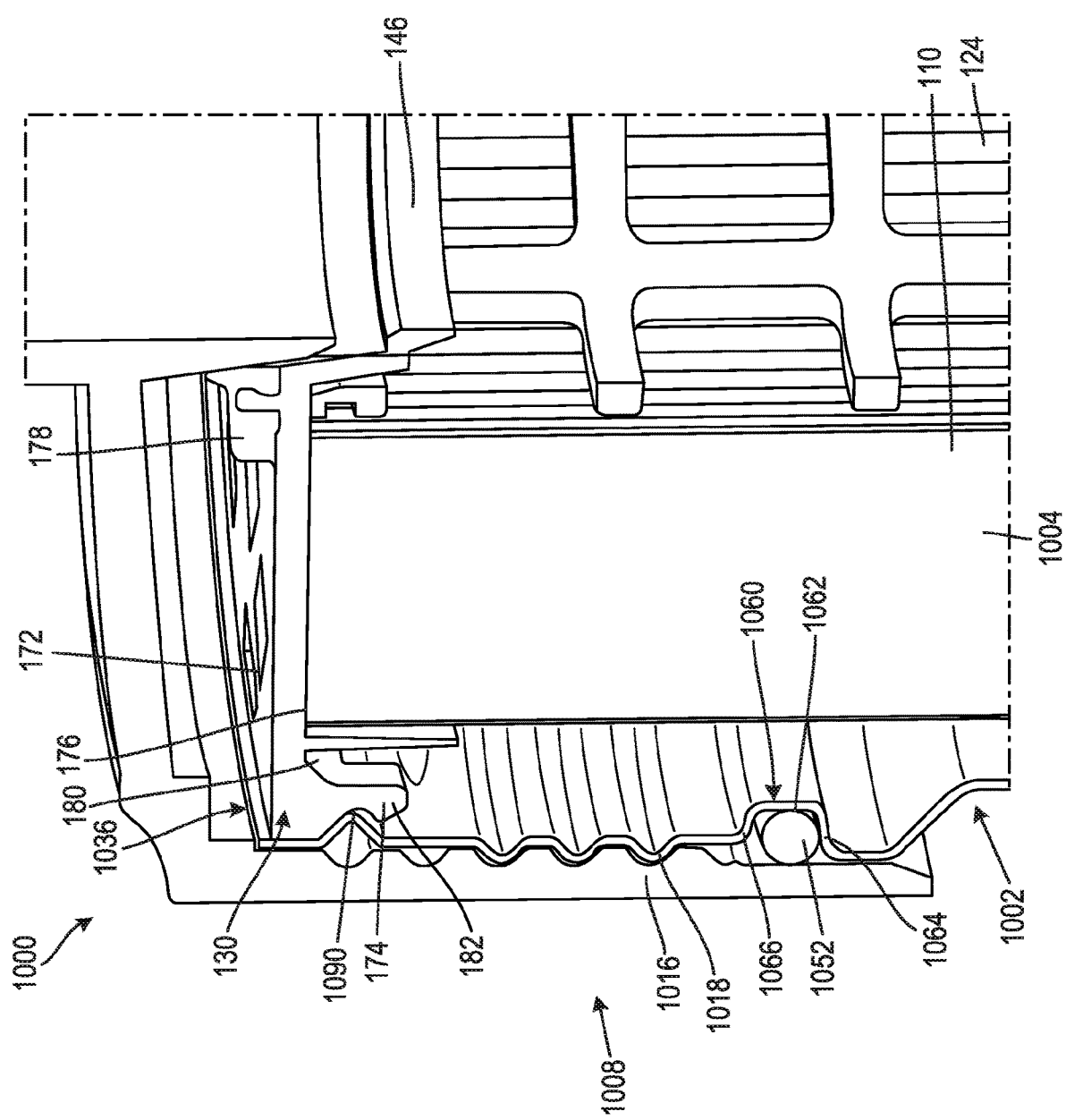
FIG. 10 shows a cross-sectional view of a portion of a radial seal formed in a filtration system according to another example embodiment.

Turning to FIG. 10, a cross-sectional view of a portion of a filtration system 1000 that includes a housing 1002, filter head 1008, and filter element 1004 is shown, according to an example embodiment. The filtration system 1000 may be a fuel filtration system, a lubricant filtration system, a hydraulic fluid filtration system, a water filtration system, or the like. The filtration system 1000 is similar to the filtration system 100 of FIG. 1A. A difference between the filtration system 1000 and the filtration system 100 is the housing 1002 includes a threaded member to engage the filter head 1008 (e.g., no adapter 106 needed). Accordingly, like numbering is used to designate similar components between the filtration system 100 and the components shown in FIG. 10.

The first endplate 130 includes a top surface 172 and a bottom surface 176. The top surface 172 and bottom surface 176 are parallel, or substantially parallel to each other, and are displaced from each other. The first endplate 130 includes a gasket 178 within the inner gasket retaining wall 179 extending from the top surface 172. In some embodiments, the gasket 178 comprises a plastic nut ring with an external thread to attach to a portion of the filter head 1008. In other embodiments, the gasket 178 comprises a plastic seal member that is formed with the filter element 1004 or the filter head 1008. A second axially protruding flange 180 extends downward from the bottom surface 176. A first axially protruding flange 174 extends downward from the top surface 172, with a radially protruding wall 182 along the surface of the first axially protruding flange 174. In some embodiments, the first axially protruding flange 174 is flexible in the radial direction toward the filter media 110. In some arrangements, the first axially protruding flange 174 and/or the radially protruding wall 182 is continuous around a circumference of the filter element 1004. The radially protruding wall 182 comprises a shape (e.g., triangular, rectangular, obtuse, angled, etc.) that allows for the first endplate 130 to be vertically pressed down, past the endplate retaining lip 1090 thereby causing the first axially protruding flange 174 to flex inward until the first endplate 130 engages the housing 1002.

The housing 1002 includes a second thread 1018 that is directly stamped onto the housing 1002 and configured to engage a complementary first thread 1016 on the filter head 1008. The second thread 1018 comprises an externally facing thread disposed on an outer wall of the housing 1002 adjacent to the housing first end 1036 and structured to engage with the first thread 1016 of the filter head 1008. The second thread 1018 extends radially outward. In some embodiments, the second thread 1018 is an undulating pattern. In other arrangements, the threaded design is that of a buttress design, whereby the threads are positivity fixed by the threads disposed on the filter head 1008. The second thread 1018 may be formed during a deep draw machining process used to form the housing 1002. In some arrangements, the second thread 1018 includes two threads per turn. The connection between the housing 1002 and the filter head 1008, however, is not particularly limited to the use of a threaded connection and may be any other appropriate detachable connections, such as a snap-fit connection or the like.

The middle portion of the housing 1002 includes the first coupling member 148 on an outer surface thereof. In this embodiment, the first coupling member 148 does not engage an adapter. Disposed between the first coupling member 148 and the housing first end 1036 is a seal member 1052 that provides a radial seal with the housing 1002 and the filter head 1008. A seal member channel 1060 receives the seal member 1052. The seal member channel 1060 includes a first retaining lip 1066, a retaining wall 1062, and a second retaining lip 1064. The first retaining lip 1066, retaining wall 1062, and second retaining lip 1064 form a 90-degree rotated, "U"-shaped channel in the housing 1002. In some embodiments, the seal member 1052 is a circular (e.g., ring) radial seal member. Beneficially, having the second thread 1018 formed with the housing 1002 (e.g., no adapter) reduces the components and cost of the filtration system 1000 while maintaining the filter assembly (e.g., housing 1002 and filter element 1004) in the filter head 1008 at high pressure.

Figure 11:
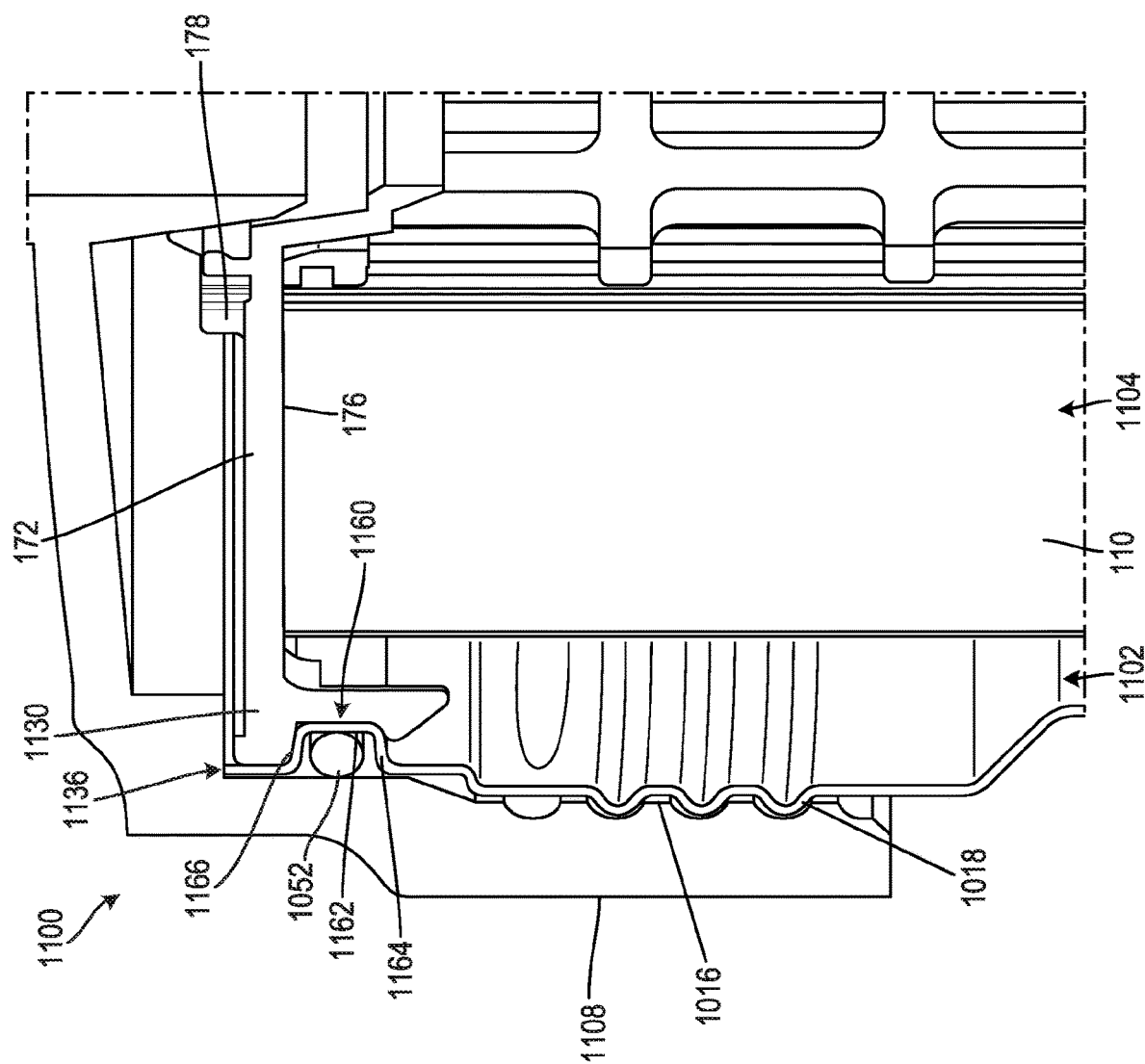
FIG. 11 shows a cross-sectional view of a portion of a radial seal formed in a filtration system according to yet another example embodiment.

Turning to FIG. 11, a cross-sectional view of a portion of a filtration system 1100 that includes a housing 1102, filter head 1108, and filter element 1104 is shown, according to an example embodiment. The filtration system 1100 may be a fuel filtration system, a lubricant filtration system, a hydraulic fluid filtration system, a water filtration system, or the like. The filtration system 1100 is similar to the filtration system 1000 of FIG. 10. A difference between the filtration system 1100 and the filtration system 1000 is the location of the seal member channel 1160 and the first endplate 1130. Accordingly, like numbering is used to designate similar components between the filtration system 1000 and the components shown in FIG. 11.

The first endplate 1130 includes a top surface 172 and a bottom surface 176. The top surface 172 and bottom surface 176 are parallel, or substantially parallel to each other, and are displaced from each other. The first endplate 1130 includes a gasket 178 within the inner gasket retaining wall 179 extending from the top surface 172. In some embodiments, the gasket 178 comprises a plastic nut ring with an external thread to attach to a portion of the filter head 1108. In other embodiments, the gasket 178 comprises a plastic seal member that is formed with the filter element 1104 or the filter head 1108. A first axially protruding flange 174 extends downward from the top surface 172, with a radially protruding wall 182 along the surface of the first axially protruding flange 174. In some embodiments, the first axially protruding flange 174 is flexible in the radial direction toward the filter media 110. In some arrangements, the first axially protruding flange 174 and/or the radially protruding wall 182 is continuous around a circumference of the filter element 1104. The radially protruding wall 182 comprises a shape (e.g., triangular, rectangular, obtuse, angled, etc.) that allows for the first endplate 1130 to be vertically pressed down, past the second retaining lip 1164 thereby causing the first axially protruding flange 174 to flex inward until the first endplate 1130 engages the housing 1102.

The housing 1102 includes a second thread 1018 that is directly stamped onto the housing 1102 and configured to engage a complementary first thread 1016 on the filter head 1108. The second thread 1018 comprises an externally facing thread disposed on an outer wall of the housing 1102 adjacent to the housing first end 1136 and structured to engage with the first thread 1016 of the filter head 1108. The second thread 1018 extends radially outward. In some embodiments, the second thread 1018 is an undulating pattern. In other arrangements, the threaded design is that of a buttress design, whereby the threads are positivity fixed by the threads disposed on the filter head 1108. The second thread 1018 may be formed during a deep draw machining process used to form the housing 1102. In some arrangements, the second thread 1018 includes two threads per turn. The connection between the housing 1102 and the filter head 1108, however, is not particularly limited to the use of a threaded connection and may be any other appropriate detachable connections, such as a snap-fit connection or the like.

The middle portion of the housing 1102 includes the first coupling member 148 on an outer surface thereof. In this embodiment, the first coupling member 148 does not engage an adapter. Disposed between the first coupling member 148 and the housing first end 1136 is a seal member 1052 that provides a radial seal with the housing 1102 and the filter head 1108. A seal member channel 1160 receives the seal member 1052. The seal member channel 1160 includes a first retaining lip 1166, a retaining wall 1162, and a second retaining lip 1164. The first retaining lip 1166, retaining wall 1162, and second retaining lip 1164 form a 90-degree rotated, "U"-shaped channel in the housing 1102. In some embodiments, the seal member 1052 is a circular (e.g., ring) radial seal member. Beneficially, having the second thread 1018 formed with the housing 1102 (e.g., no adapter) reduces the components and cost of the filtration system 1100 while maintaining the filter assembly (e.g., housing 1102 and filter element 1104) in the filter head 1108 at high pressure.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A filtration system, comprising:
    a housing defining an internal volume, the housing comprising a housing first end, a housing second end, and a first coupling member formed in the housing, the housing first end being an open end and the housing second end being a closed end;
    a filter element positioned within the internal volume of the housing, the filter element configured to engage the first coupling member;
    a filter head;
    an adapter positioned around the housing, the adapter configured to be coupled to the filter head; and
    a seal member disposed between the housing first end and the housing second end, the seal member providing a radial seal directly between the housing and the filter head.

2. The filtration system of claim 1, wherein the housing comprises a first coupling surface, the filter head comprises a first thread formed on a filter head surface thereof, and the adapter comprises:
    a second coupling surface formed on an adapter first end of the adapter, the second coupling surface engaging the first coupling surface so as to removably couple the adapter and the housing; and a second thread formed on the adapter first end, the second thread engaging the first thread formed on the filter head surface so as to removably couple the adapter and the filter head.

3. The filtration system of claim 2, wherein the second coupling surface is formed on an internal surface on the adapter first end of the adapter, and wherein the first coupling surface is formed on an external surface in the housing first end.

4. The filtration system of claim 2, wherein the second thread is formed on an external surface on the adapter first end, and wherein the first thread is formed on an internal surface of the filter head.

5. The filtration system of claim 1, wherein the filter element comprises a first endplate adjacent the housing first end when the filter element is disposed within the internal volume, a second endplate disposed axially away from the first endplate, and filter media extending axially between the first endplate and the second endplate, the first endplate defining a top surface and a bottom surface substantially parallel to the top surface, the first endplate comprising an axially protruding flange extending from the bottom surface away from the top surface, the axially protruding flange comprising a radially protruding wall configured to engage an endplate retaining lip disposed along the first coupling member.

6. The filtration system of claim 5, wherein a seal member channel is formed on an external surface of the housing between the housing first end and the first coupling member, the seal member channel adjacent to the endplate retaining lip, the seal member channel configured to receive the seal member.

7. The filtration system of claim 6, wherein the housing further comprises:
a first retaining lip disposed adjacent to the first coupling member; and
a retaining wall extending from the first retaining lip toward the bottom surface of the first endplate, wherein the seal member channel is formed by the first retaining lip, a portion of the bottom surface of the first endplate, and the retaining wall, wherein the portion of the bottom surface of the first endplate is substantially parallel to the first retaining lip, and wherein the retaining wall is substantially perpendicular to the first retaining lip and the bottom surface of the first endplate.

8. The filtration system of claim 6, wherein the housing further comprises:
a first retaining lip disposed adjacent to the first coupling member; and
a second retaining lip disposed axially away from the first retaining lip and oriented substantially parallel to the first retaining lip, wherein the seal member channel is formed by the first retaining lip, the second retaining lip and a retaining wall extending from the first retaining lip toward the second retaining lip, the retaining wall substantially perpendicular to the first retaining lip and the second retaining lip, the housing further comprising a top channel portion extending from the second retaining lip and covering a portion of the top surface of the first endplate.

9. The filtration system of claim 6, wherein the housing comprises a first coupling surface, the filter head comprises a first thread formed on a filter head surface thereof, and the adapter comprises:
a second coupling surface formed on an adapter first end of the adapter, the second coupling surface engaging the first coupling surface so as to removably couple the adapter and the housing; and
a second thread formed on the adapter first end, the second thread engaging the first thread formed on the filter head surface so as to removably couple the adapter and the filter head,
wherein the seal member channel is formed by a top portion of the adapter first end adjacent the second coupling surface, a retaining lip disposed axially from the top portion of the adapter first end, the retaining lip substantially parallel to the top portion of the adapter first end, and portion of the external surface of the housing, the portion of the external surface of the housing substantially perpendicular the retaining lip and the top portion of the adapter first end, the housing further comprising a top channel portion extending from the retaining lip and covering a portion of the top surface of the first endplate.

10. The filtration system of claim 9, wherein the seal member is a rectangular seal member.

11. The filtration system of claim 1, wherein the filter element comprises:
filter media; and
a first endplate coupled to a filter media first end of the filter media, the first endplate comprising:
a base; and
a first endplate flange positioned about a periphery of the base, the first endplate flange extending from the base towards the housing second end and configured to engage the first coupling member; wherein a seal member channel is formed on an external surface of the housing between the first endplate flange and the first coupling member, the seal member channel configured to receive the seal member.

12. The filtration system of claim 1, wherein a seal member channel is formed on an external surface of the housing between the housing first end and the housing second end, the seal member channel configured to receive the seal member.

13. The filtration system of claim 12, wherein the seal member channel is formed by a first retaining lip adjacent to the first coupling member, a second retaining lip disposed axially from the first retaining lip, the second retaining lip substantially parallel to the first retaining lip, and a retaining wall extending from the first retaining lip toward the second retaining lip, the retaining wall substantially perpendicular to the first retaining lip and the second retaining lip.

* * * * *